(12) United States Patent
Nakashio et al.

(10) Patent No.: US 11,107,505 B2
(45) Date of Patent: Aug. 31, 2021

(54) CARTRIDGE

(71) Applicant: SONY CORPORATION, Tokyo (JP)

(72) Inventors: Eiji Nakashio, Tokyo (JP); Kazuo Anno, Tokyo (JP); Shinya Tochikubo, Tokyo (JP); Takanobu Iwama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/886,191

(22) Filed: May 28, 2020

(65) Prior Publication Data

US 2020/0321033 A1 Oct. 8, 2020

Related U.S. Application Data

(63) Continuation of application No. 16/453,403, filed on Jun. 26, 2019, now Pat. No. 10,796,724.

(30) Foreign Application Priority Data

Apr. 5, 2019 (JP) .............................. JP2019-073161

(51) Int. Cl.
*G11B 5/584* (2006.01)
*G11B 27/30* (2006.01)
(Continued)

(52) U.S. Cl.
CPC ...... *G11B 27/3027* (2013.01); *G11B 23/0312* (2013.01); *G11B 23/0316* (2013.01);
(Continued)

(58) Field of Classification Search
None
See application file for complete search history.

(56) References Cited

U.S. PATENT DOCUMENTS

| 4,916,555 A | 4/1990 | Hathaway et al. |
| 5,739,976 A | 4/1998 | Sakai et al. |

(Continued)

FOREIGN PATENT DOCUMENTS

| JP | WO99/29488 | 6/1999 |
| JP | 2002-025227 | 1/2002 |

(Continued)

OTHER PUBLICATIONS

Japanese Office Action dated Jul. 14, 2020 in corresponding Japanese Application No. 2020-098689.
(Continued)

*Primary Examiner* — Tan X Dinh
(74) *Attorney, Agent, or Firm* — K&L Gates LLP

(57) ABSTRACT

A cartridge includes a tape-shaped magnetic recording medium and a cartridge memory. The cartridge memory includes a communication unit that communicates with a recording/reproducing device in a state where the cartridge is loaded on the recording/reproducing device; a storage unit; and a control unit that stores information received from the recording/reproducing device through the communication unit in the storage unit, reads the information from the storage unit according to a request from the recording/reproducing device, and transmits the information to the recording/reproducing device through the communication unit. The information includes manufacturing information of the cartridge and adjustment information for adjusting a tension applied to the magnetic recording medium in a longitudinal direction thereof, and the tape-shaped magnetic recording medium has a plurality of servo bands.

26 Claims, 11 Drawing Sheets

(51) Int. Cl.
*G11B 23/03* (2006.01)
*G11B 5/588* (2006.01)
*G11B 5/55* (2006.01)

(52) U.S. Cl.
CPC ............ *G11B 5/5504* (2013.01); *G11B 5/584* (2013.01); *G11B 5/588* (2013.01); *G11B 23/0313* (2013.01); *G11B 2220/90* (2013.01)

(56) References Cited

U.S. PATENT DOCUMENTS

| | | | |
|---|---|---|---|
| 5,830,548 | A | 11/1998 | Andersen et al. |
| 6,190,753 | B1 | 2/2001 | Koseki et al. |
| 7,341,798 | B2 | 3/2008 | Hirai |
| 7,474,505 | B2 | 1/2009 | Hirai |
| 7,499,820 | B1 | 3/2009 | Peterson |
| 7,531,252 | B2 | 5/2009 | Sueoka et al. |
| 8,797,682 | B1 | 8/2014 | Biskeborn et al. |
| 9,214,164 | B2 | 12/2015 | Biskeborn et al. |
| 9,721,601 | B2 | 8/2017 | Biskeborn et al. |
| 10,276,204 | B1 | 4/2019 | Judd et al. |
| 10,665,259 | B1* | 5/2020 | Yamaga ............. G11B 5/00813 |
| 10,796,724 | B1* | 10/2020 | Nakashio ........... G11B 23/0312 |
| 2002/0061422 | A1 | 5/2002 | Kikuchi |
| 2004/0089564 | A1 | 5/2004 | Kuse et al. |
| 2004/0247859 | A1 | 12/2004 | Sasaki et al. |
| 2006/0087767 | A1 | 4/2006 | Hirai |
| 2006/0187589 | A1 | 8/2006 | Harasawa et al. |
| 2007/0230054 | A1 | 10/2007 | Takeda |
| 2008/0055777 | A1 | 3/2008 | Rou et al. |
| 2008/0297950 | A1 | 12/2008 | Noguchi et al. |
| 2009/0049310 | A1* | 2/2009 | Carlson ................. G06F 3/0619 713/193 |
| 2009/0086369 | A1 | 4/2009 | Ishida et al. |
| 2010/0081011 | A1 | 4/2010 | Nakamura |
| 2011/0170214 | A1* | 7/2011 | Bui ........................ G11B 15/43 360/71 |
| 2011/0267717 | A1* | 11/2011 | Cherubini .............. G11B 5/584 360/77.12 |
| 2013/0044386 | A1* | 2/2013 | Sato ....................... G11B 20/10 360/15 |
| 2013/0172515 | A1 | 7/2013 | Horie et al. |
| 2015/0193173 | A1* | 7/2015 | Bates .................... G06F 3/0664 711/112 |
| 2017/0090761 | A1* | 3/2017 | Hasegawa ............... G06F 3/064 |
| 2018/0082710 | A1 | 3/2018 | Tada et al. |
| 2018/0240485 | A1 | 8/2018 | Bui et al. |
| 2018/0286447 | A1* | 10/2018 | Ozawa .................... G11B 5/712 |
| 2019/0143637 | A1 | 5/2019 | Nakashio et al. |
| 2019/0180781 | A1 | 6/2019 | Handa et al. |
| 2019/0378540 | A1 | 12/2019 | Sekiguchi et al. |
| 2020/0143830 | A1* | 5/2020 | Judd .................. G11B 5/00813 |
| 2020/0357434 | A1* | 11/2020 | Yamaga ................. G11B 5/133 |
| 2021/0012804 | A1* | 1/2021 | Nakashio ............... G11B 23/30 |
| 2021/0027803 | A1* | 1/2021 | Adachi .............. G11B 5/00813 |

FOREIGN PATENT DOCUMENTS

| | | |
|---|---|---|
| JP | 2002-210820 | 7/2002 |
| JP | 2004-005898 | 1/2004 |
| JP | 2004-030809 | 1/2004 |
| JP | 2005-199724 | 7/2005 |
| JP | 2005-276258 | 10/2005 |
| JP | 2005-285268 | 10/2005 |
| JP | 2005285268 A | 10/2005 |
| JP | 2005-332510 | 12/2005 |
| JP | 2005-346865 | 12/2005 |
| JP | 2006-099919 | 4/2006 |
| JP | 2006-107597 | 4/2006 |
| JP | 2006-216195 | 8/2006 |
| JP | 2007-095132 | 4/2007 |
| JP | 2007-226943 | 9/2007 |
| JP | 2007-294079 | 11/2007 |
| JP | 2007-305197 | 11/2007 |
| JP | 2009-087471 | 4/2009 |
| JP | 2009-223923 | 10/2009 |
| JP | 2009-245523 | 10/2009 |
| JP | 2011-150744 | 8/2011 |
| JP | 2011-170944 | 9/2011 |
| JP | M11-181121 | 9/2011 |
| JP | 2013-041646 | 2/2013 |
| JP | 2015-135717 | 7/2015 |
| JP | 2017-191633 | 10/2017 |
| JP | 2017-228331 | 12/2017 |
| JP | 2019-046521 | 3/2019 |
| WO | 2005/046968 | 5/2005 |
| WO | 2015/198514 | 12/2015 |
| WO | 2017/085931 | 5/2017 |
| WO | 2018/199105 | 11/2018 |

OTHER PUBLICATIONS

Japanese Office Action dated Aug. 20, 2019 in corresponding Japanese Application No. 2019-073161.
Japanese Office Action dated Aug. 27, 2019 in corresponding Japanese Application No. 2019-132384.
Decision to Grant dated Sep. 20, 2019 in corresponding Japanese Application No. 2019-132384.
Japanese Office Action dated Jan. 14, 2020 in corresponding Japanese Application No. 2019-195213.
Japanese Office Action dated Feb. 18, 2020 in corresponding Japanese Application No. 2019-195213.

* cited by examiner

CARTRIDGE

CROSS REFERENCE TO RELATED APPLICATIONS

The present application is a continuation of U.S. patent application Ser. No. 16/453,403, filed on Jun. 26, 2019, which claims priority to Japanese Patent Application JP 2019-073161 filed on Apr. 5, 2019, the entire contents of which are incorporated herein by reference.

TECHNICAL FIELD

The present disclosure relates to a cartridge and a cartridge memory.

BACKGROUND ART

In recent years, in a magnetic tape (tape-shaped magnetic recording medium) used as a data storage for a computer, a track width and a distance between adjacent tracks are very narrow in order to improve a data recording density. When the track width and the distance between tracks are narrow in this way, a maximum allowable change amount as a dimensional change amount of the tape itself due to an environmental factor such as changes in temperature and humidity is smaller.

For this reason, PTL 1 proposes a magnetic tape medium capable of suppressing a dimensional change in a width direction caused by an environmental factor to a low level and securing stable recording/reproducing characteristics with less off-track. Furthermore, PTL 1 describes that the dimensional change amount in the width direction with respect to a tension change in a longitudinal direction is reduced.

CITATION LIST

Patent Literature

[PTL 1]
JP 2005-332510 A

SUMMARY

Technical Problem

In recent years, due to a demand for increasing the capacity of a magnetic tape, the number of recording tracks has increased, and the width of a recording track has been narrowed. For this reason, after data is recorded on a magnetic tape, if the width of the magnetic tape fluctuates even slightly due to some causes, it may be impossible for a recording/reproducing device to accurately reproduce the data recorded on the magnetic tape, and an error may occur. In other words, reliability of reproduction may be decreased.

In the present disclosure, it is desirable to provide a cartridge and a cartridge memory capable of suppressing a decrease in reliability of reproduction.

Solution to Problem

According to an embodiment of the present disclosure, a first disclosure provides a cartridge including:
a tape-shaped magnetic recording medium;
a communication unit that communicates with a recording/reproducing device;
a storage unit; and
a control unit that stores information received from the recording/reproducing device through the communication unit in the storage unit, reads the information from the storage unit according to a request from the recording/reproducing device, and transmits the information to the recording/reproducing device through the communication unit, in which
the information includes adjustment information for adjusting a tension applied to the magnetic recording medium in a longitudinal direction thereof,
the magnetic recording medium has an average thickness $t_T$ satisfying $t_T \leq 5.5$ [µm], and
the magnetic recording medium has a dimensional change amount $\Delta w$ satisfying $650$ [ppm/N]$\leq \Delta w$ in a width direction thereof with respect to a tension change of the magnetic recording medium in the longitudinal direction thereof.

A second disclosure provides a cartridge including:
a tape-shaped magnetic recording medium; and
a storage unit having an area in which adjustment information for adjusting a tension applied to the magnetic recording medium in a longitudinal direction thereof is written, in which
the magnetic recording medium has an average thickness $t_T$ satisfying $t_T \leq 5.5$ [µm], and
the magnetic recording medium has a dimensional change amount $\Delta w$ satisfying $650$ [ppm/N]$\leq \Delta w$ in a width direction thereof with respect to a tension change of the magnetic recording medium in the longitudinal direction thereof.

A third disclosure provides a cartridge memory used for a tape-shaped magnetic recording medium, including:
a communication unit that communicates with a recording/reproducing device;
a storage unit; and
a control unit that stores information received from the recording/reproducing device through the communication unit in the storage unit, reads the information from the storage unit according to a request from the recording/reproducing device, and transmits the information to the recording/reproducing device through the communication unit, in which
the information includes adjustment information for adjusting a tension applied to the magnetic recording medium in a longitudinal direction thereof.

A fourth disclosure provides a cartridge memory used for a tape-shaped magnetic recording medium, including
a storage unit having an area in which adjustment information for adjusting a tension applied to the magnetic recording medium in a longitudinal direction thereof is written.

DESCRIPTION OF EMBODIMENTS

Figure 1:
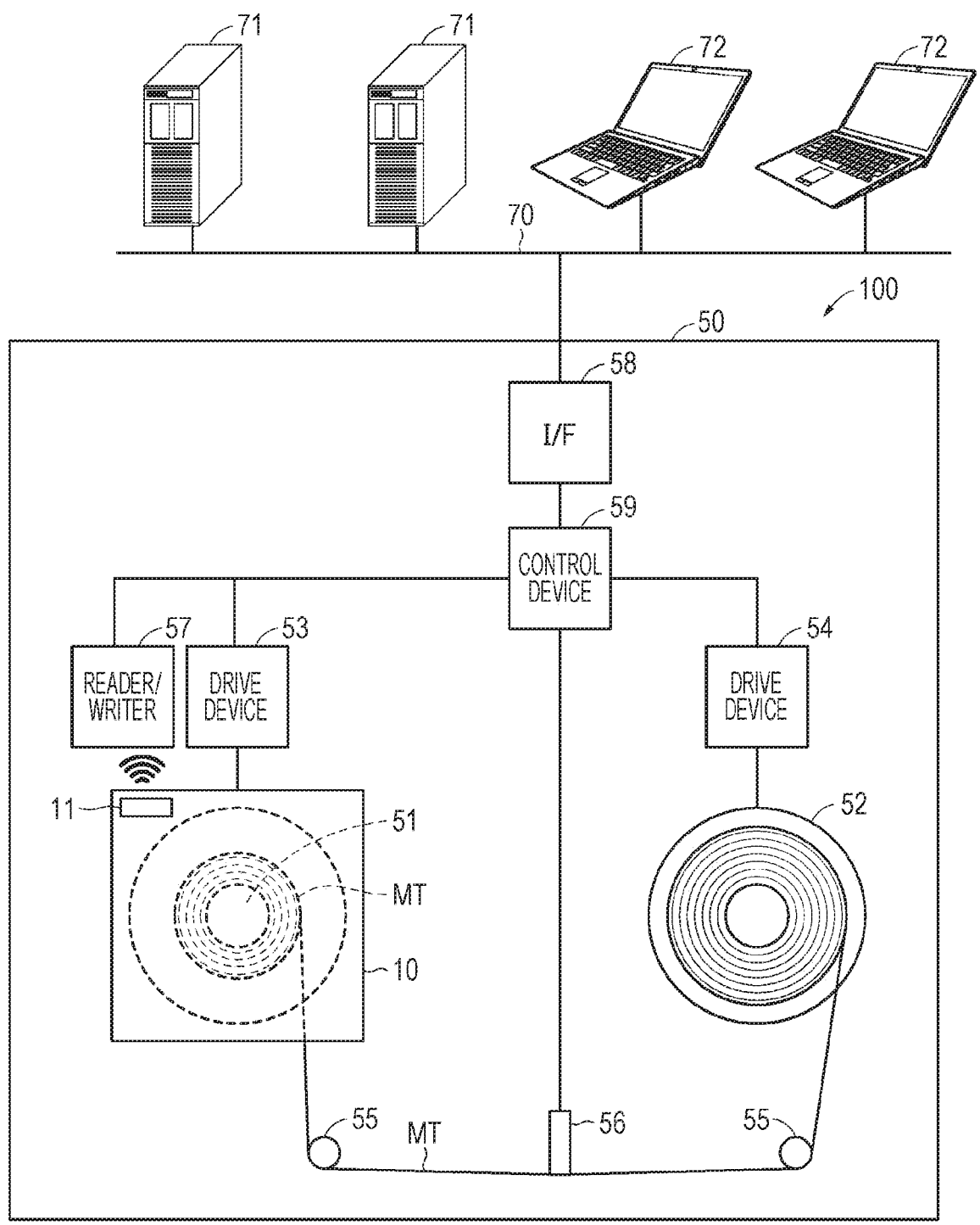
FIG. 1 is a schematic diagram illustrating an example of a configuration of a recording/reproducing system according to a first embodiment of the present disclosure.

Embodiments of the present disclosure will be described in the following order. Note that in all the drawings of the following embodiments, the same or corresponding parts are denoted by the same reference numerals.
1 First embodiment
2 Second embodiment
3. Modification 1. First Embodiment

[Outline]

The present inventors are studying a magnetic tape suitable for use in a recording/reproducing device capable of keeping the width of the magnetic tape constant or almost constant by adjusting a tension applied to the magnetic tape in a longitudinal direction thereof. Furthermore, it is conceivable that the adjustment of the tension is performed using tension adjustment information stored in advance in a cartridge memory. However, according to findings of the present inventors, as described above, since a general magnetic tape has a small dimensional change amount in a width direction with respect to a tension change in a longitudinal direction, it is difficult to keep the width of the magnetic tape constant or almost constant by the recording/reproducing device.

Therefore, the present inventors have intensively studied a magnetic tape capable of keeping the width of the magnetic tape constant or almost constant by the recording/reproducing device. As a result, contrary to the above-described general magnetic tape, a magnetic tape having a large dimensional change amount in a width direction with respect to a tension change in a longitudinal direction, specifically, a magnetic tape in which a dimensional change amount $\Delta w$ in a width direction with respect to a tension change in a longitudinal direction satisfies 650 $[ppm/N] \le \Delta w$ has been found.

[Configuration of Recording/Reproducing System]

FIG. 1 is a schematic diagram illustrating an example of a configuration of a recording/reproducing system 100 according to a first embodiment of the present disclosure. The recording/reproducing system 100 is a magnetic tape recording/reproducing system, and includes a cartridge 10 and a recording/reproducing device 50 capable of loading and unloading the cartridge 10.

[Configuration of Cartridge]

Figure 2:
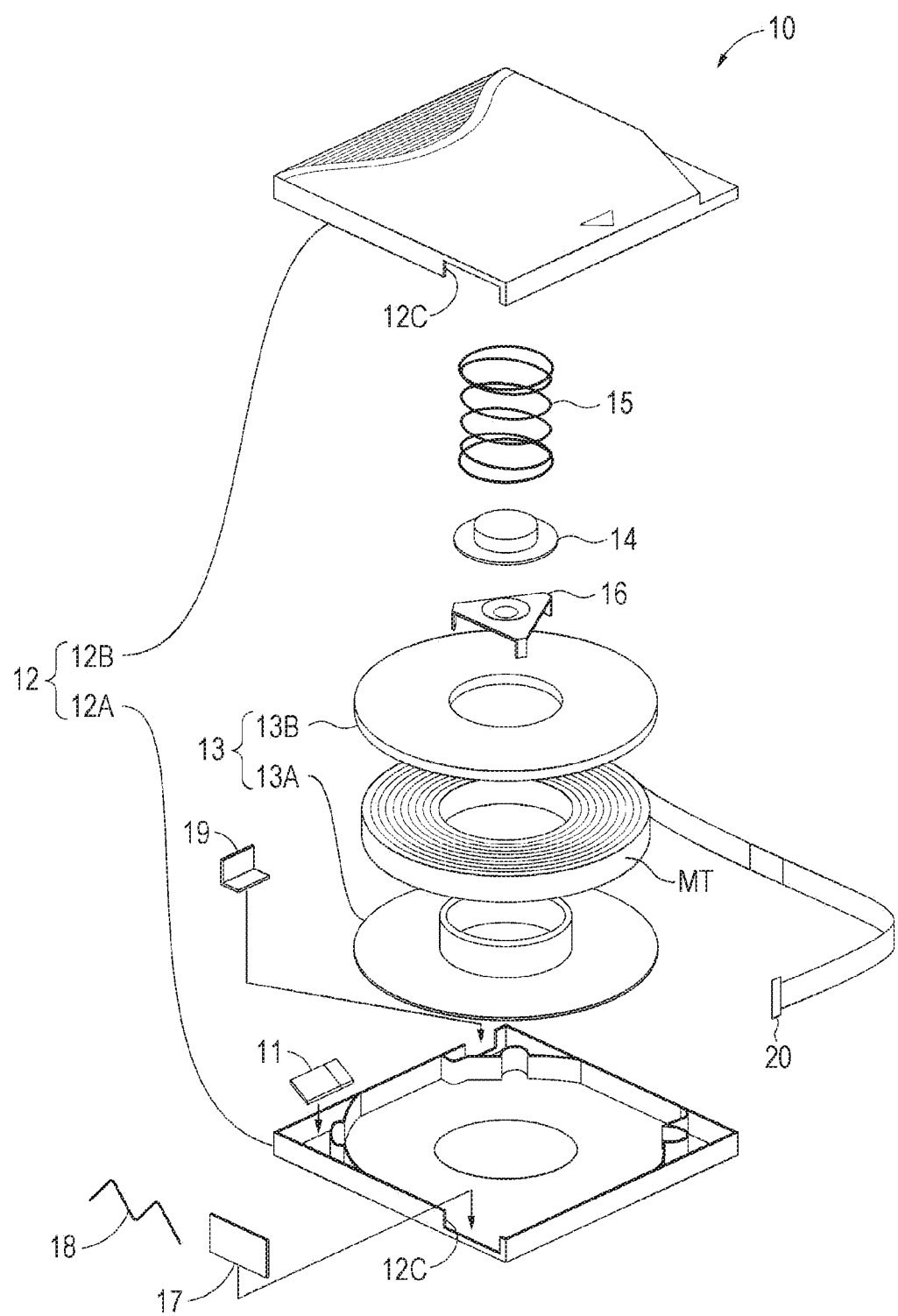
FIG. 2 is an exploded perspective view illustrating an example of a configuration of a cartridge.

FIG. 2 is an exploded perspective view illustrating an example of a configuration of the cartridge 10. The cartridge 10 is a magnetic tape cartridge conforming to a linear tape-open (LTO) standard, and includes: in a cartridge case 12 including a lower shell 12A and an upper shell 12B, a reel 13 around which a magnetic tape (tape-shaped magnetic recording medium) MT is wound; a reel lock 14 for locking rotation of the reel 13; a reel spring 15; a spider 16 for releasing a locked state of the reel 13; a slide door 17 that opens and closes a tape outlet 12C formed in the cartridge case 12 so as to straddle the lower shell 12A and the upper shell 12B; a door spring 18 that urges the slide door 17 to a closed position of the tape outlet 12C; a write protect 19 for preventing erroneous erasure; and a cartridge memory 11. The reel 13 has a substantially disk shape with an opening at the center, and includes a reel hub 13A and a flange 13B made of a hard material such as plastic. A leader pin 22 is disposed at one end of the magnetic tape MT. The cartridge memory 11 is disposed near one corner of the cartridge 10. The cartridge memory 11 faces a reader/writer 57 of the recording/reproducing device 50 in a state where the cartridge 10 is loaded on the recording/reproducing device 50. The cartridge memory 11 communicates with the recording/reproducing device 50, specifically, with the reader/writer 57 according to a wireless communication standard conforming to an LTO standard.

[Configuration of Cartridge Memory]

Figure 3:
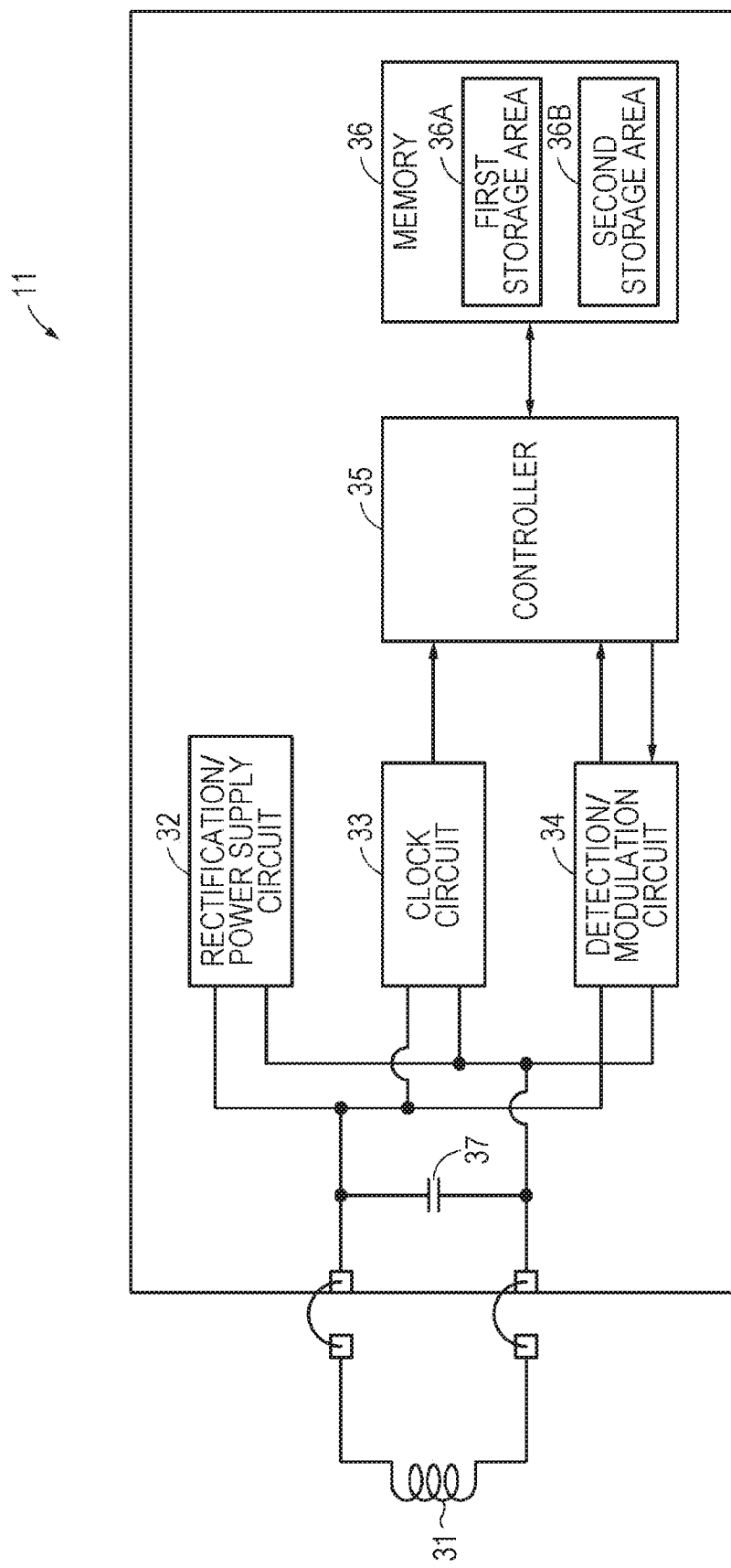
FIG. 3 is a block diagram illustrating an example of a configuration of a cartridge memory.

FIG. 3 is a block diagram illustrating an example of a configuration of the cartridge memory 11. The cartridge memory 11 includes: an antenna coil (communication unit) 31 that communicates with the reader/writer 57 according to a prescribed communication standard; a rectification/power supply circuit 32 that generates power using an induced electromotive force from a radio wave received by the antenna coil 31 and performs rectification to generate a power supply; a clock circuit 33 that generates a clock using an induced electromotive force similarly from the radio wave received by the antenna coil 31; a detection/modulation circuit 34 that performs detection of the radio wave received by the antenna coil 31 and modulation of a signal transmitted by the antenna coil 31; a controller (control unit) 35 including a logic circuit or the like for determining a command and data from a digital signal extracted from the detection/modulation circuit 34 and processing the command and data; and a memory (storage unit) 36 that stores information. Furthermore, the cartridge memory 11 includes a capacitor 37 connected in parallel to the antenna coil 31, and the antenna coil 31 and the capacitor 37 constitute a resonant circuit.

The memory 36 stores information and the like related to the cartridge 10. The memory 36 is a non-volatile memory (NVM). The memory 36 preferably has a storage capacity of about 32 KB or more. For example, in a case where the cartridge 10 conforms to an LTO-9 standard or an LTO-10 standard, the memory 36 has a storage capacity of about 32 KB.

The memory 36 has a first storage area 36A and a second storage area 36B. The first storage area 36A corresponds to a storage area of a cartridge memory conforming to an LTO standard prior to LTO 8 (hereinafter referred to as "conventional cartridge memory") and is an area for storing information conforming to an LTO standard prior to LTO 8. The information conforming to an LTO standard prior to LTO 8 is, for example, manufacturing information (for example, a unique number of the cartridge 10) or a usage history (for example, the number of times of tape withdrawal (thread count)).

The second storage area 36B corresponds to an extended storage area for a storage area of the conventional cartridge memory. The second storage area 36B is an area for storing additional information. Here, the additional information means information related to the cartridge 10, not prescribed by an LTO standard prior to LTO 8. Examples of the additional information include tension adjustment information, management ledger data, Index information, and thumbnail information of a moving image stored in a magnetic tape MT, but are not limited to the data. The tension adjustment information includes a distance between adjacent servo bands (a distance between servo patterns recorded in adjacent servo bands) at the time of data recording on the magnetic tape MT. The distance between the adjacent servo bands is an example of width-related information related to the width of the magnetic tape MT. Details of the distance between the servo bands will be described later. In the following description, information stored in the first storage area 36A may be referred to as "first information", and information stored in the second storage area 36B may be referred to as "second information".

The memory 36 may have a plurality of banks. In this case, some of the plurality of banks may constitute the first storage area 36A, and the remaining banks may constitute the second storage area 36B. Specifically, for example, in a case where the cartridge 10 conforms to an LTO-9 standard or an LTO-10 standard, the memory 36 may have two banks each having a storage capacity of about 16 KB. One of the two banks may constitute the first storage area 36A, and the other bank may constitute the second storage area 36B.

The antenna coil 31 induces an induced voltage by electromagnetic induction. The controller 35 communicates with the recording/reproducing device 50 according to a prescribed communication standard through the antenna coil 31. Specifically, for example, mutual authentication, transmission and reception of commands, and exchange of data are performed. The controller 35 stores information received from the recording/reproducing device 50 through the antenna coil 31 in the memory 36. The controller 35 reads out information from the memory 36 in response to a request from the recording/reproducing device 50, and transmits the information to the recording/reproducing device 50 through the antenna coil 31.

[Configuration of Magnetic Tape]

Figure 4:
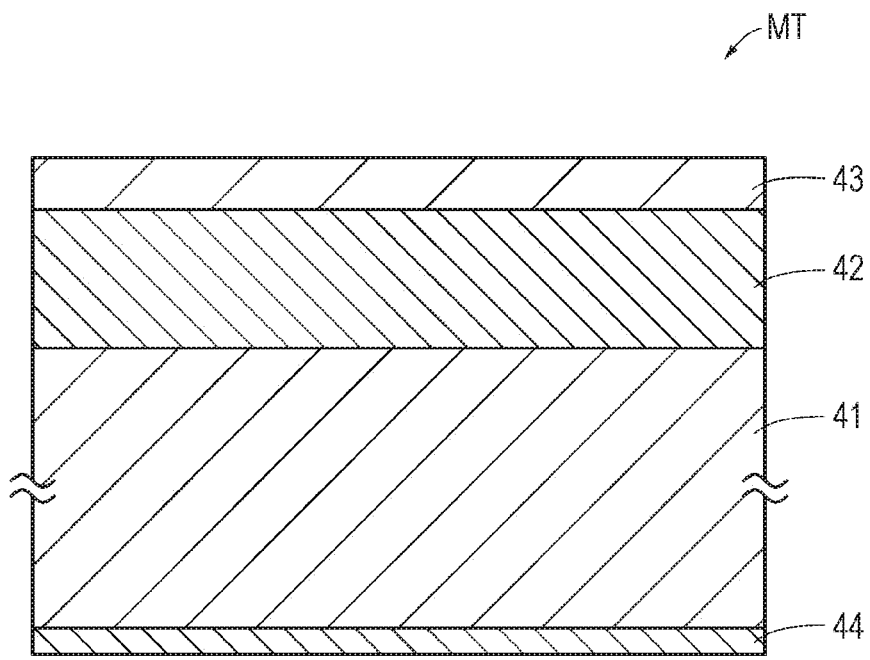
FIG. 4 is a cross-sectional view illustrating an example of a configuration of a magnetic tape.

FIG. 4 is a cross-sectional view illustrating an example of a configuration of a magnetic tape MT used for the cartridge 10. The magnetic tape MT is, for example, a perpendicular magnetic recording type magnetic tape, and includes: a long substrate 41; a base layer (nonmagnetic layer) 42 disposed on one main surface of the substrate 41; a recording layer (magnetic layer) 43 disposed on the base layer 42; and a back layer 44 disposed on the other main surface of the substrate 41. Note that the base layer 42 and the back layer 44 are disposed as necessary and may be omitted. Hereinafter, of both main surfaces of the magnetic tape MT, a surface on which the recording layer 43 is disposed may be referred to as a magnetic surface, and the surface opposite thereto, on which the back layer 44 is disposed, may be referred to as a back surface.

The magnetic tape MT has a long shape and travels in a longitudinal direction thereof during recording/reproduction. Furthermore, the magnetic tape MT can record a signal at the shortest recording wavelength of preferably 100 nm or less, more preferably 75 nm or less, still more preferably 60 nm or less, particularly preferably 50 nm or less, and is used, for example, for a recording/reproducing device having the shortest recording wavelength within the above range. This recording/reproducing device may include a ring type head as a recording head.

(Substrate)

The substrate 41 serving as a support is a flexible, long, and nonmagnetic substrate. The substrate 41 is a film, and an average thickness $T_{sub}$ of the substrate 41 is preferably 3 μm or more and 8 μm or less, more preferably 3 μm or more and 4.2 μm or less, still more preferably 3 μm or more and 3.8 μm or less, and particularly preferably 3 μm or more and 3.4 μm or less. The average thickness $T_{sub}$ of the substrate 41 is determined as follows. First, a magnetic tape MT having a width of ½ inches is prepared and cut into a length of 250 mm to manufacture a sample. Subsequently, layers of the sample other than the substrate 41 (that is, the base layer 42, the recording layer 43, and the back layer 44) are removed with a solvent such as methyl ethyl ketone (MEK) or dilute hydrochloric acid. Next, the thickness of the sample (substrate 41) is measured at five or more points using a laser hologage manufactured by Mitutoyo Corporation as a measuring device, and the measured values are simply averaged (arithmetically averaged) to calculate the average thickness $T_{sub}$ of the substrate 41. Note that the measurement points are randomly selected from the sample.

The substrate 41 contains, for example, at least one of a polyester, a polyolefin, a cellulose derivative, a vinyl-based resin, an aromatic polyether ketone (PAEK), and another polymer resin. In a case where the substrate 41 contains two or more of the above materials, the two or more materials may be mixed, copolymerized, or laminated.

The polyester includes, for example, at least one of polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), and polyethylene bisphenoxycarboxylate.

The polyolefin includes, for example, at least one of polyethylene (PE) and polypropylene (PP). The cellulose derivative includes, for example, at least one of cellulose diacetate, cellulose triacetate, cellulose acetate butyrate (CAB), and cellulose acetate propionate (CAP). The vinyl-based resin includes, for example, at least one of polyvinyl chloride (PVC) and polyvinylidene chloride (PVDC). The aromatic polyether ketone (PAEK) includes, for example, polyether ether ketone (PEEK).

The other polymer resin includes, for example, at least one of polyamide or nylon (PA), aromatic polyamide or aramid (aromatic PA), polyimide (PI), aromatic polyimide (aromatic PI), polyamide imide (PAI), aromatic polyamide imide (aromatic PAI), polybenzoxazole (PBO) such as ZYLON (registered trademark), polyether, polyether ketone (PEK), polyether ester, polyether sulfone (PES), polyether imide (PEI), polysulfone (PSF), polyphenylene sulfide (PPS), polycarbonate (PC), polyarylate (PAR), and polyurethane (PU).

(Recording Layer)

The recording layer 43 is a so-called perpendicular recording layer, and contains, for example, magnetic powder and a binder. The recording layer 43 may further contain one or more additives selected from the group consisting of a lubricant, conductive particles, an abrasive, a rust inhibitor, and the like, as necessary.

The recording layer 43 has a surface having a large number of holes formed thereon, and a lubricant is preferably stored in the large number of holes. This makes it possible to reduce a friction due to a contact between the magnetic tape MT and a head. The large number of holes preferably extend in a direction perpendicular to the surface of the recording layer 43. This is because a property of supplying the lubricant to the surface of the recording layer 43 can be improved. Note that some of the large number of holes may extend in the perpendicular direction.

An average thickness $t_m$ of the recording layer 43 satisfies preferably 35 [nm]≤$t_m$≤90 [nm], more preferably 35 [nm]≤$t_m$≤80 [nm], still more preferably 35 [nm]≤$t_m$≤70 [nm], particularly preferably 35 [nm]≤$t_m$≤50 [nm]. When the average thickness $t_m$ of the recording layer 43 satisfies 35 [nm]≤$t_m$, output can be secured in a case where an MR type head is used as a reproducing head, and therefore electromagnetic conversion characteristics can be improved. Meanwhile, when the average thickness $t_m$ of the recording layer 43 satisfies $t_m$≤90 [nm], an influence of a demagnetizing field can be reduced in a case where a ring type head is used as a recording head, and therefore electromagnetic conversion characteristics can be improved.

The average thickness $t_m$ of the recording layer 43 can be determined as follows. First, the magnetic tape MT is thinly processed perpendicularly to a main surface thereof to manufacture a sample piece. A cross section of the sample piece is observed with a transmission electron microscope (TEM) under the following conditions.

Device: TEM (H9000NAR manufactured by Hitachi, Ltd.)
Acceleration voltage: 300 kV
Magnification: 100,000 times Next, using the obtained TEM image, the thickness of the recording layer 43 is measured at 10 or more points in a longitudinal direction of the magnetic tape MT. Thereafter, the measured values are simply averaged (arithmetically averaged), and the obtained value is taken as the average thickness $t_m$ (nm) of the layer 43.

Figure 5A:
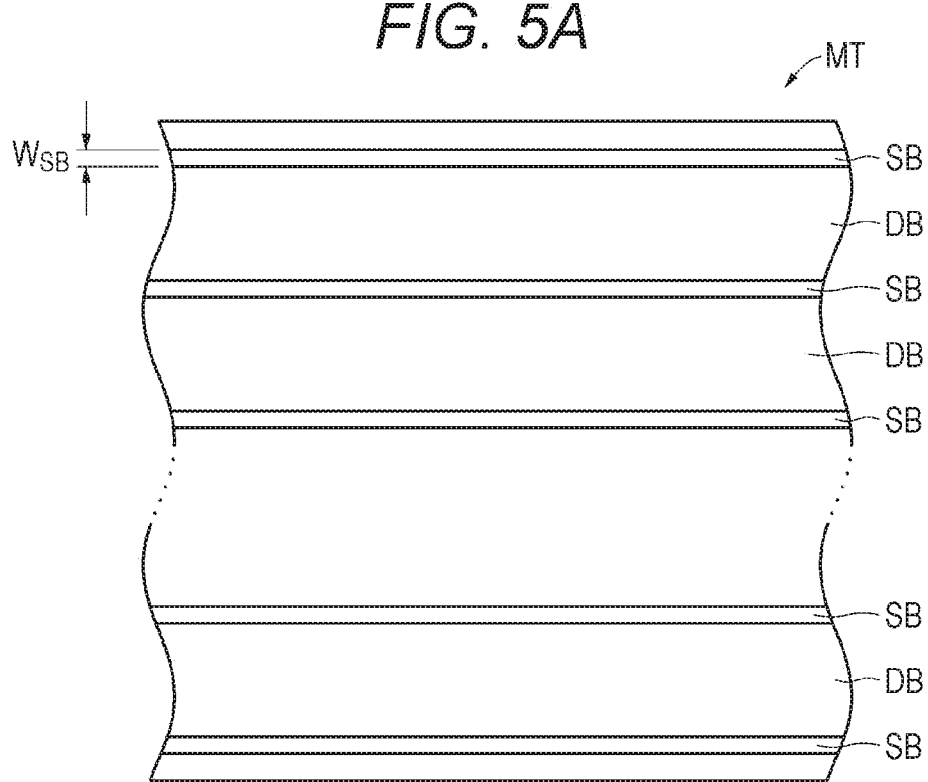
FIG. 5A is a schematic view of a layout of a data band and a servo band.

As illustrated in FIG. 5A, the recording layer 43 preferably has a plurality of servo bands SB and a plurality of data bands DB in advance. The plurality of servo bands SB is disposed at regular intervals in a width direction of the magnetic tape MT. A data band DB is disposed between adjacent servo bands SB. In each of the servo bands SB, a servo signal for performing tracking control of a magnetic head is written in advance. In each of the data bands DB, user data is recorded by the recording/reproducing device 50.

An upper limit value of a ratio $R_S$ (=($S_{SB}$/S)×100) of a total area $S_{SB}$ of the servo bands SB with respect to an area S of a surface of the recording layer 43 is preferably 4.0% or less, more preferably 3.0% or less, and still more preferably 2.0% or less from a viewpoint of securing a high recording capacity. Meanwhile, a lower limit value of the ratio $R_S$ of the total area $S_{SB}$ of the servo bands SB with respect to the area S of a surface of the recording layer 43 is preferably 0.8% or more from a viewpoint of securing five or more servo tracks.

The ratio $R_S$ of the total area $S_{SB}$ of the servo bands SB with respect to the area S of a surface of the recording layer 43 is determined as follows. First, a surface of the recording layer 43 is observed using a magnetic force microscope (MFM) to acquire an MFM image. Subsequently, using the acquired MFM image, a servo bandwidth $W_{SB}$ and the number of servo bands SB are measured. Next, the ratio $R_S$ is determined from the following formula.

Ratio $R_S$[%]=(((servo bandwidth $W_{SB}$)×(number of servo bands))/(width of magnetic tape $MT$))×100

A lower limit value of the number of servo bands SB is preferably 5 or more, more preferably 5+4n (in which n represents a positive integer) or more, and still more preferably 9+4n or more. When the number of servo bands SB is 5 or more, an influence on a servo signal due to a dimensional change of the magnetic tape MT in a width direction thereof can be suppressed, and stable recording/reproducing characteristics with less off-track can be secured. An upper limit value of the number of servo bands SB is not particularly limited, but is for example, 33 or less. The number of servo bands SB can be confirmed as follows. First, a surface of the recording layer 43 is observed using a magnetic force microscope (MFM) to acquire an MFM image. Next, the number of servo bands SB is counted using the MFM image.

An upper limit value of a servo bandwidth $W_{SB}$ is preferably 95 μm or less, more preferably 60 μm or less, and still more preferably 30 μm or less from a viewpoint of securing a high recording capacity. A lower limit value of a servo bandwidth $W_{SB}$ is preferably 10 μm or more. It is difficult to manufacture a recording head capable of reading a servo signal having a servo bandwidth $W_{SB}$ of less than 10 μm.

A servo bandwidth $W_{SB}$ can be determined as follows. First, a surface of the recording layer 43 is observed using a magnetic force microscope (MFM) to acquire an MFM image. Next, a servo bandwidth $W_{SB}$ is measured using the MFM image.

Figure 5B:
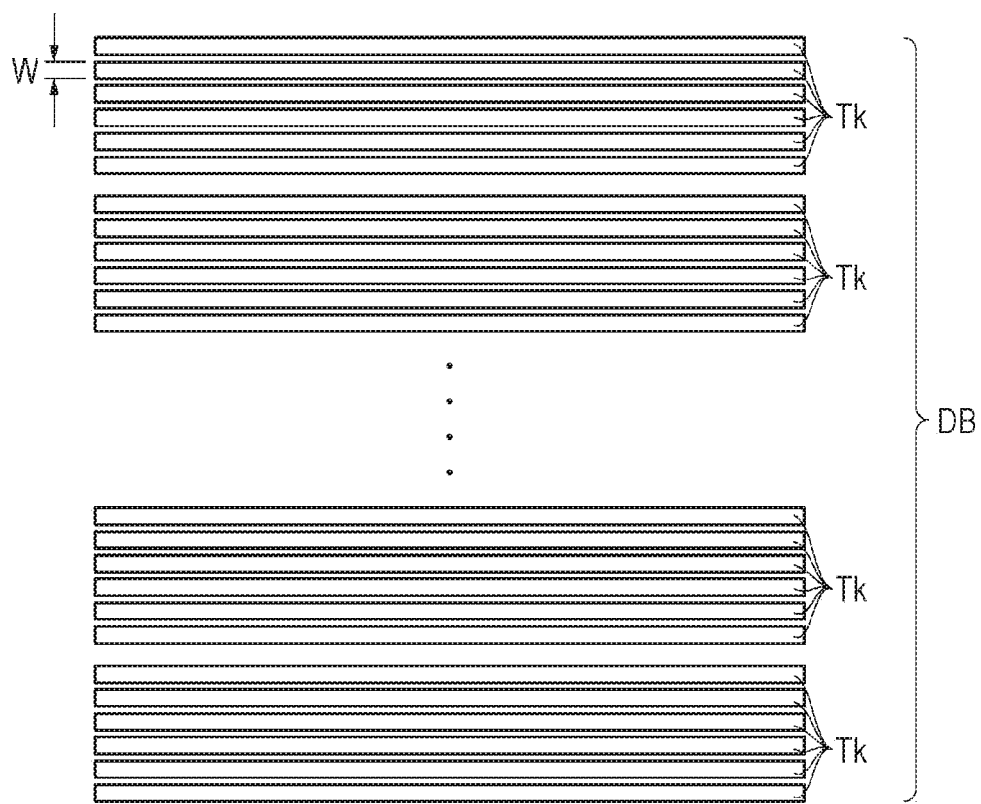
FIG. 5B is an enlarged view of the data band.

As illustrated in FIG. 5B, the recording layer 43 can form a plurality of data tracks Tk in a data band DB. The total number of data tracks Tk that can be formed in the recording layer 43 is preferably 6000 or more from a viewpoint of securing a high recording capacity. An upper limit value of a data track width W is preferably 3.0 μm or less, more preferably 1.6 μm or less, still more preferably 0.95 μm or less, and particularly preferably 0.51 μm from a viewpoint of improving a track recording density and securing a high recording capacity. A lower limit value of the data track width W is preferably 0.02 μm or more in consideration of a magnetic particle size.

The recording layer 43 can record data such that a minimum value L of a distance between magnetization inversions and the data track width W satisfy preferably W/L≤200, more preferably W/L≤60, still more preferably W/L≤45, particularly preferably W/L≤30. When the minimum value L of the distance between magnetization inversions is a constant value, and the minimum value L of the distance between magnetization inversions and the track width W satisfy W/L>200 (that is, the track width W is large), a track recording density is not increased. Therefore, it may be impossible to sufficiently secure a recording capacity. Furthermore, when the track width W is a constant value, and the minimum value L of the distance between magnetization inversions and the track width W satisfy W/L>200 (that is, the minimum value L of the distance between magnetization inversions is small), a bit length is short, and a linear recording density is high. However, SNR may be significantly deteriorated due to an effect of spacing loss. Therefore, in order to suppress the deterioration of SNR while securing the recording capacity, W/L is preferably in a range of W/L≤60 as described above. However, W/L is not limited to the above range, and may satisfy W/L≤23 or W/L≤13. A lower limit value of W/L is not particularly limited, but for example, satisfies 1≤W/L.

The recording layer 43 can record data such that the minimum value L of the distance between magnetization inversions is preferably 50 nm or less, more preferably 48 nm or less, still more preferably 44 nm or less, and particularly preferably 40 nm from a viewpoint of securing a high recording capacity. A lower limit value of the minimum value L of the distance between magnetization inversions is preferably 20 nm or more in consideration of a magnetic particle size.

(Magnetic Powder)

The magnetic powder contains powder of nanoparticles containing ε iron oxide (hereinafter referred to as "ε iron oxide particles"). The ε iron oxide particles are hard magnetic particles that can obtain a high coercive force even when being fine particles. ε iron oxide contained in the ε iron oxide particles is preferably crystal-oriented preferentially in a thickness direction (perpendicular direction) of the magnetic tape MT.

The ε iron oxide particle has a spherical shape or a substantially spherical shape, or has a cubic shape or a substantially cubic shape. Since the ε iron oxide particle has the shape as described above, in a case where the ε iron oxide particles are used as magnetic particles, a contact area between the particles in a thickness direction of the magnetic tape MT can be reduced, and aggregation of the particles can be suppressed as compared to a case where hexagonal plate-shaped barium ferrite particles are used as the magnetic particles. Therefore, dispersibility of the magnetic powder can be enhanced, and a better signal-to-noise ratio (SNR) can be obtained. The ε iron oxide particle has a core-shell type structure. Specifically, the ε iron oxide particle has a core portion and a two-layered shell portion disposed around the core portion. The two-layered shell portion includes a first shell portion disposed on the core portion and a second shell portion disposed on the first shell portion.

The core portion contains ε iron oxide. ε iron oxide contained in the core portion preferably contains an $\varepsilon\text{-Fe}_2\text{O}_3$ crystal as a main phase, and more preferably contains $\varepsilon\text{-Fe}_2\text{O}_3$ as a single phase.

The first shell portion covers at least a part of the periphery of the core portion. Specifically, the first shell portion may partially cover the periphery of the core portion or may cover the entire periphery of the core portion. The first shell portion preferably covers the entire surface of the core portion from a viewpoint of making exchange coupling between the core portion and the first shell portion sufficient and improving magnetic characteristics.

The first shell portion is a so-called soft magnetic layer, and includes, for example, a soft magnetic material such as α-Fe, a Ni—Fe alloy, or a Fe—Si—Al alloy. α-Fe may be obtained by reducing ε iron oxide contained in the core portion.

The second shell portion is an oxide film as an antioxidant layer. The second shell portion contains α iron oxide, aluminum oxide, or silicon oxide. α-iron oxide contains, for example, at least one iron oxide of $\text{Fe}_3\text{O}_4$, $\text{Fe}_2\text{O}_3$, and FeO. In a case where the first shell portion contains α-Fe (soft magnetic material), α-iron oxide may be obtained by oxidizing α-Fe contained in the first shell portion.

By inclusion of the first shell portion in the ε iron oxide particle as described above, a coercive force Hc of the entire ε iron oxide particles (core-shell particles) can be adjusted to a coercive force Hc suitable for recording while a coercive force Hc of the core portion alone is maintained at a large value in order to secure thermal stability. Furthermore, by inclusion of the second shell portion in the ε iron oxide particle as described above, it is possible to suppress deterioration of the characteristics of the ε iron oxide particles due to generation of a rust or the like on surfaces of the particles by exposure of the ε iron oxide particles to the air during a step of manufacturing the magnetic tape MT and before the step. Therefore, characteristic deterioration of the magnetic tape MT can be suppressed.

The magnetic powder has an average particle size (average maximum particle size) of, for example, 22.5 nm or less. The average particle size (average maximum particle size) of the magnetic powder is preferably 22 nm or less, more preferably 8 nm or more and 22 nm or less, still more preferably 12 nm or more and 22 nm or less, particularly preferably 12 nm or more and 15 nm or less, and most preferably 12 nm or more and 14 nm or less. In the magnetic tape MT, an area having a half size of a recording wavelength is an actual magnetization area. Therefore, by setting the average particle size of the magnetic powder to a half or less of the shortest recording wavelength, it is possible to obtain good electromagnetic conversion characteristics (for example, SNR). Therefore, when the average particle size of the magnetic powder is 22 nm or less, in a magnetic tape MT having a high recording density (for example, a magnetic tape MT that can record a signal at the shortest recording wavelength of 44 nm or less), good electromagnetic conversion characteristics (for example, SNR) can be obtained. Meanwhile, when the average particle size of the magnetic powder is 8 nm or more, dispersibility of the magnetic powder is further improved, and better electromagnetic conversion characteristics (for example, SNR) can be obtained.

The magnetic powder has an average aspect ratio of preferably 1.0 or more and 3.0 or less, more preferably 1.0 or more and 2.5 or less, still more preferably 1.0 or more and 2.1 or less, particularly preferably 1.0 or more and 1.8 or less. When the average aspect ratio of the magnetic powder is within a range of 1.0 or more and 3.0 or less, aggregation of particles of the magnetic powder can be suppressed. Furthermore, when the magnetic powder is perpendicularly oriented in a step of forming the recording layer 43, resistance applied to the magnetic powder can be suppressed. Therefore, perpendicular orientation of the magnetic powder can be improved.

The average particle size and the average aspect ratio of the magnetic powder can be determined as follows. First, a magnetic tape MT to be measured is processed by a focused ion beam (FIB) method or the like to manufacture a thin piece, and a cross section of the thin piece is observed with TEM. Next, 50 ε iron oxide particles are randomly selected from the photographed TEM photograph, and a long axis length DL and a short axis length DS of each of the ε iron oxide particles are measured. Here, the long axis length DL means the largest distance among distances between two parallel lines drawn from all angles so as to come into contact with an outline of an ε iron oxide particle (so-called maximum Feret diameter). Meanwhile, the short axis length DS means the largest length among the lengths of an ε iron oxide particle in a direction orthogonal to the long axis of the ε iron oxide particle.

Subsequently, the long axis lengths DL of the measured 50 ε iron oxide particles are simply averaged (arithmetically averaged) to determine an average long axis length DLave. The average long axis length DLave determined in this manner is taken as an average particle size of the magnetic powder. Furthermore, the short axis lengths DS of the measured 50 ε iron oxide particles are simply averaged (arithmetically averaged) to determine an average short axis length DSave. Then, an average aspect ratio (DLave/DSave) of the ε iron oxide particles is determined from the average long axis length DLave and the average short axis length DSave. The magnetic powder has an average particle volume of preferably 5600 nm³ or less, more preferably 250 nm$^3$ or more and 5600 nm$^3$ or less, still more preferably 900 nm$^3$ or more and 5600 nm$^3$ or less, particularly preferably 900 nm$^3$ or more and 1800 nm$^3$ or less, most preferably 900 nm$^3$ or more and 1500 nm$^3$ or less. In general, noise of the magnetic tape MT is inversely proportional to a square root of the number of particles (that is, proportional to a square root of a particle volume). Therefore, by reducing the particle volume, good electromagnetic conversion characteristics (for example, SNR) can be obtained. Therefore, when the average particle volume of the magnetic powder is 5600 nm$^3$ or less, good electromagnetic conversion characteristics (for example, SNR) can be obtained with a similar effect to that in a case where the average particle size of the magnetic powder is 22 nm or less. Meanwhile, when the average particle volume of the magnetic powder is 250 nm$^3$ or more, a similar effect to that in a case where the average particle size of the magnetic powder is 8 nm or more can be obtained. In a case where the ε iron oxide particle has a spherical shape or a substantially spherical shape, the average particle volume of the magnetic powder is determined as follows. First, an average long axis length DLave is determined in a similar manner to the above-described method for calculating the average particle size of the magnetic powder. Next, an average particle volume V of the magnetic powder is determined by the following formula.

$$V = (\pi/6) \times DLave^3$$

In a case where the ε iron oxide particle has a cubic shape or a substantially cubic shape, the average particle volume of the magnetic powder is determined as follows. First, a magnetic tape MT to be measured is processed by an FIB method or the like to manufacture a thin piece, and a cross section of the thin piece is observed with TEM. Subsequently, 50 ε iron oxide particles each having a plane parallel to the TEM cross section are randomly selected from the photographed TEM photograph, and the length L of one side of each of the ε iron oxide particles is measured. Next, the lengths L of one sides of the measured 50 ε iron oxide particles are simply averaged (arithmetically averaged) to determine an average side length Lave.

$$V = Lave^3$$

(Binder)

As the binder, a resin having a structure in which a crosslinking reaction is imparted to a polyurethane-based resin, a vinyl chloride-based resin, or the like is preferable. However, the binder is not limited to these resins, and other resins may be blended appropriately according to physical properties and the like required for a magnetic tape MT. Usually, a resin to be blended is not particularly limited as long as being generally used in an application type magnetic tape MT.

Examples of the resin to be blended include polyvinyl chloride, polyvinyl acetate, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinyl chloride-vinylidene chloride copolymer, a vinyl chloride-acrylonitrile copolymer, an acrylate-acrylonitrile copolymer, an acrylate-vinylidene chloride copolymer, a methacrylate-vinylidene chloride copolymer, a methacrylate-vinyl chloride copolymer, a methacryate-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, and nitrocellulose), a styrene-butadiene copolymer, a polyester resin, an amino resin, and a synthetic rubber. Furthermore, examples of a thermosetting resin or a reactive resin include a phenol resin, an epoxy resin, a urea resin, a melamine resin, an alkyd resin, a silicone resin, a polyamine resin, and a urea formaldehyde resin.

Furthermore, in order to improve dispersibility of the magnetic powder, a polar functional group such as —SO$_3$M, —OSO$_3$M, —COOM, or P=O(OM)$_2$ may be introduced into each of the above-described binders. Here, in the formulae, M represents a hydrogen atom or an alkali metal such as lithium, potassium, or sodium.

Moreover, examples of the polar functional group include a side chain type group having a terminal group of —NR1R2 or —NR1R2R3$^+$X$^-$, and a main chain type group of >NR1R2$^+$X$^-$. Here, in the formulae, R1, R2, and R3 each represent a hydrogen atom or a hydrocarbon group, and X$^-$ represents an ion of a halogen element such as fluorine, chlorine, bromine, or iodine, or an inorganic or organic ion. Furthermore, examples of the polar functional group include —OH, —SH, —CN, and an epoxy group.

(Additive)

As nonmagnetic reinforcing particles, the recording layer 43 may further contain aluminum oxide (α, β, or γ alumina), chromium oxide, silicon oxide, diamond, garnet, emery, boron nitride, titanium carbide, silicon carbide, titanium carbide, titanium oxide (rutile type or anatase type titanium oxide), and the like.

(Base Layer)

The base layer 42 is a so-called nonmagnetic layer, and contains, for example, nonmagnetic powder and a binder. The base layer 42 may further contain one or more additives selected from the group consisting of conductive particles, a lubricant, a curing agent, a rust inhibitor, and the like, as necessary.

An average thickness $t_u$ of the base layer 42 is preferably 0.6 μm or more and 2.0 μm or less, and more preferably 0.8 μm or more and 1.4 μm or less. Note that the average thickness $t_u$ of the base layer 42 is determined in a similar manner to the average thickness $t_m$ of the recording layer 43. However, a magnification of a TEM image is appropriately adjusted according to the thickness of the base layer 42.

(Nonmagnetic Powder)

The nonmagnetic powder may be made of an inorganic substance or an organic substance. Furthermore, the nonmagnetic powder may be made of carbon black or the like. Examples of the inorganic substance include a metal, a metal oxide, a metal carbonate, a metal sulfate, a metal nitride, a metal carbide, and a metal sulfide. Examples of the shape of the nonmagnetic powder include various shapes such as an acicular shape, a spherical shape, a cubic shape, and a plate shape, but are not limited thereto.

(Binder)

The binder is similar to that of the above-described recording layer 43.

(Back Layer)

The back layer 44 contains a binder and nonmagnetic powder. The back layer 44 may contain various additives such as a lubricant, a curing agent, and an antistatic agent, as necessary. The binder and the nonmagnetic powder are similar to those of the above-described base layer 42. The inorganic particles have an average particle size of preferably 10 nm or more and 150 nm or less, more preferably 15 nm or more and 110 nm or less. The average particle size of the inorganic particles can be determined in a similar to an average particle size D of the above-described magnetic powder.

An average thickness $t_b$ of the back layer 44 preferably satisfies $t_b \leq 0.6$ [μm]. By setting the average thickness $t_b$ of the back layer 44 within the above range, even in a case where the average thickness $t_T$ of the magnetic tape MT satisfies $t_T \leq 5.5$ [μm], the thicknesses of the base layer 42 and the substrate 41 can be kept large. This makes it possible to maintain traveling stability of the magnetic tape MT in the recording/reproducing device.

The average thickness $t_b$ of the back layer 44 is determined as follows. First, a magnetic tape MT having a width of ½ inches is prepared and cut into a length of 250 mm to manufacture a sample. Next, the thickness of the sample is measured at five or more different points using a laser hologage manufactured by Mitutoyo Corporation as a measuring device, and the measured values are simply averaged (arithmetically averaged) to calculate the average thickness $t_T$ [μm]. Subsequently, the back layer 44 of the sample is removed with a solvent such as methyl ethyl ketone (MEK) or dilute hydrochloric acid. Thereafter, the thickness of the sample is measured at five or more different points again using the above-described laser hologage, and the measured values are simply averaged (arithmetically averaged) to calculate an average thickness $t_B$ [μm]. Thereafter, the average thickness $t_b$ (μm) of the back layer 44 is determined by the following formula.

$$t_b \, [\mu m] = t_T \, [\mu m] - t_B \, [\mu m]$$

(Average Thickness $t_T$ of Magnetic Tape)

The average thickness $t_T$ of the magnetic tape MT satisfies $t_T \leq 5.5$ μm, preferably $t_T \leq 5.2$ μm, more preferably $t_T \leq 5.0$ μm, still more preferably $t_T \leq 4.6$ μm, particularly preferably $t_T \leq 4.4$ [μm]. When the average thickness $t_T$ of the magnetic tape MT satisfies $t_T \leq 5.5$ [μm], a recording capacity that can be recorded in one data cartridge can be increased compared to related art. A lower limit value of the average thickness $t_T$ of the magnetic tape MT is not particularly limited, but satisfies, for example, $3.5 \, \mu m \leq t_T$.

The average thickness $t_T$ of the magnetic tape MT is determined in a similar manner to the average thickness $t_T$ at the average thickness $t_b$ of the back layer 44.

(Dimensional Change Amount Δw)

A dimensional change amount Δw [ppm/N] of the magnetic tape MT in a width direction thereof with respect to a tension change of the magnetic tape MT in a longitudinal direction thereof satisfies 650 ppm/N≤Δw, preferably 670 ppm/N≤Δw, more preferably 680 ppm/N≤Δw, still more preferably 700 ppm/N≤Δw, particularly preferably 750 ppm/N≤Δw, most preferably 800 ppm/N≤Δw. When the dimensional change amount Δw satisfies Δw≤650 ppm/N, in adjustment of a tension applied to the magnetic tape MT in a longitudinal direction thereof by the recording/reproducing device 50, it may be difficult to suppress a change in the width of the magnetic tape MT. An upper limit value of the dimensional change amount Δw is not particularly limited, but may satisfy, for example, Δw≤1700000 ppm/N, preferably Δw≤20000 ppm/N, more preferably Δw≤8000 ppm/N, still more preferably Δw≤5000 ppm/N, Δw≤4000 ppm/N, Δw≤3000 ppm/N, or Δw≤2000 ppm/N.

The dimensional change amount Δw can be set to a desired value by selecting the substrate 41. For example, the dimensional change amount Δw can be set to a desired value by selecting at least one of the thickness of the substrate 41 and a material of the substrate 41. Furthermore, the dimensional change amount Δw may be set to a desired value, for example, by adjusting stretching strength of the substrate 41 in a width direction thereof and a longitudinal direction thereof. For example, by stretching the substrate 41 more strongly in the width direction thereof, the dimensional change amount Δw decreases more. Conversely, by stretching the substrate 41 more strongly in the longitudinal direction thereof, the dimensional change amount Δw increases.

The dimensional change amount Δw is determined as follows. First, a magnetic tape MT having a width of ½ inches is prepared and cut into a length of 250 mm to manufacture a sample 10S. Next, a load is applied to the sample 10S in a longitudinal direction thereof in the order of 0.2 N, 0.6 N, and 1.0 N, and the width of the sample 10S at each load of 0.2 N, 0.6 N, and 1.0 N is measured. Subsequently, the dimensional change amount Δw is determined by the following formula. Note that the measurement in a case of applying a load of 0.6 N is performed in order to confirm whether abnormality has occurred in the measurement (in particular, in order to confirm that these three measurement results are linear). The measurement results are not used in the following formula.

$$\Delta w [ppm/N] = \frac{D(0.2 \text{ N})[mm] - D(1.0 \text{ N})[mm]}{D(0.2 \text{ N})[mm]} \times \frac{1{,}000{,}000}{(1.0 \text{ [N]}) - (0.2 \text{ [N]})} \quad \text{[Math. 1]}$$

Figure 6:
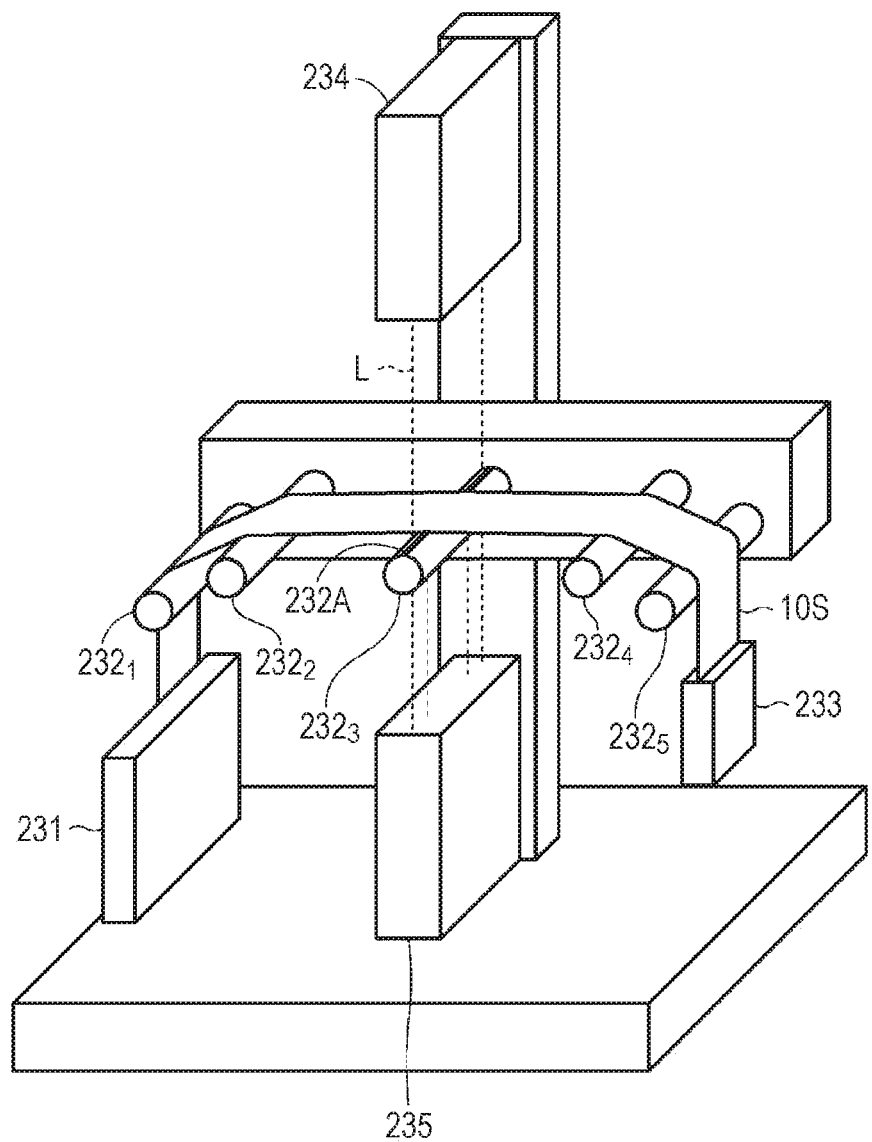
FIG. 6 is a perspective view illustrating a configuration of a measuring device.

(In which, D (0.2 N) and D (1.0 N) indicate the widths of the sample 10S when loads of 0.2 N and 1.0 N are applied to the sample 10S in a longitudinal direction thereof, respectively). The width of the sample 10S when each load is applied is measured as follows. First, a measuring device incorporating a digital dimension measuring instrument LS-7000 manufactured by Keyence Corporation, illustrated in FIG. 6, is prepared as a measuring device, and the sample 10S is set in this measuring device. Specifically, one end of the long sample (magnetic tape MT) 10S is fixed by a fixing portion 231. Next, as illustrated in FIG. 6, the sample 10S is placed on five substantially cylindrical and rod-shaped support members $232_1$ to $232_5$. The sample 10S is placed on the support members $232_1$ to $232_5$ such that the back surface thereof comes into contact with the five support members $232_1$ to $232_5$. The five support members $232_1$ to $232_5$ (particularly surfaces thereof) are all formed of stainless steel SUS304, and have a surface roughness Rz (maximum height) of 0.15 μm to 0.3 μm.

Disposition of the five rod-shaped support members $232_1$ to $232_5$ will be described with reference to FIG. 6. As illustrated in FIG. 6, the sample 10S is placed on the five support members $232_1$ to $232_5$. Hereinafter, the five support members $232_1$ to $232_5$ will be referred to as "first support member $232_1$", "second support member $232_2$", "third support member $232_3$" (having a slit 232A), "fourth support member $232_4$", and "fifth support member $232_5$" (closest to a weight 233) from a side closest to the fixing portion 231. Each of the five first to fifth support members $232_1$ to $232_5$ has a diameter of 7 mm. A distance d1 between the first support member $232_1$ and the second support member $232_2$ (in particular, a distance between the central axes of these support members) is 20 mm. A distance d2 between the second support member $232_2$ and the third support member $232_3$ is 30 mm. A distance d3 between the third support member $232_3$ and the fourth support member $232_4$ is 30 mm. A distance d4 between the fourth support member $232_4$ and the fifth support member $232_5$ is 20 mm.

Furthermore, the three support members $232_2$ to $232_4$ are disposed such that portions of the sample 10S between the second support member $232_2$ and the third support member 232₃ and between the third support member 232₃ and the fourth support member 232₄ form a plane substantially perpendicular to the direction of gravity. Furthermore, the first support member 232₁ and the second support member 232₂ are disposed such that the sample 10S forms an angle of θ1=30° with respect to the substantially perpendicular plane between the first support member 232₁ and the second support member 232₂. Moreover, the fourth support member 232₄ and the fifth support member 232₅ are disposed such that the sample 10S forms an angle of θ2=30° with respect to the substantially perpendicular plane between the fourth support member 232₄ and the fifth support member 232₅. Furthermore, among the five first to fifth support members 232₁ to 232₅, the third support member 232₃ is fixed so as not to rotate, but the other four first, second, fourth, and fifth support members 232₁, 232₂, 232₄, and 232₅ are all rotatable. The sample 10S is held so as not to move in a width direction of the sample 10S on the support members 232₁ to 232₅. Note that among the support members 232₁ to 232₅, the support member 232₃ located between a light emitter 234 and a light receiver 235 and located substantially at the center between the fixing portion 231 and a portion to which a load is applied has the slit 232A. Light L is emitted from the light emitter 234 to the light receiver 235 through the slit 232A. The slit 232A has a slit width of 1 mm, and the light L can pass through the slit 232A without being blocked by a frame of the slit 232A.

Subsequently, the measuring device is housed in a chamber controlled under a constant environment in which the temperature is 25° C. and the relative humidity is 50%. Thereafter, the weight 233 for applying a load of 0.2 N is attached to the other end of the sample 10S, and the sample 10S is left in the environment for two hours. After being left for two hours, the width of the sample 10S is measured. Next, the weight for applying a load of 0.2 N is changed to a weight for applying a load of 0.6 N, and the width of the sample 10S is measured five minutes after the change. Finally, the weight is changed to a weight for applying a load of 1.0 N, and the width of the sample 10S is measured five minutes after the change.

As described above, by adjusting the weight of the weight 233, a load applied to the sample 10S in a longitudinal direction thereof can be changed. With each load applied, the light L is emitted from the light emitter 234 toward the light receiver 235, and the width of the sample 10S to which the load is applied in a longitudinal direction thereof is measured. The measurement of the width is performed in a state where the sample 10S is not curled. The light emitter 234 and the light receiver 235 are included in the digital dimension measuring instrument LS-7000.

(Temperature Expansion Coefficient α)

The magnetic tape MT preferably has a temperature expansion coefficient α satisfying 6 [ppm/° C.]≤α≤8 [ppm/° C.]. When the temperature expansion coefficient α is within the above range, the change in the width of the magnetic tape MT can be further suppressed by adjusting a tension applied to the magnetic tape MT in a longitudinal direction thereof by the recording/reproducing device.

The temperature expansion coefficient α is determined as follows. First, the sample 10S is manufactured in a similar manner to the method for measuring the dimensional change amount Δw, and the sample 10S is set in a measuring device similar to that in the method for measuring the dimensional change amount Δw. Thereafter, the measuring device is housed in a chamber controlled under a constant environment in which the temperature is 29° C. and the relative humidity is 24%. Next, a load of 0.2 N is applied to the sample 10S in a longitudinal direction thereof, and the sample 10S is conformed to the above environment. Thereafter, while the relative humidity is maintained at 24%, the temperature is changed in the order of 45° C., 29° C., and 10° C., the width of the sample 10S is measured at 45° C. and 10° C., and the temperature expansion coefficient α is determined by the following formula. Note that the measurement of the width of the sample 10S at the temperature of 29° C. is performed in order to confirm whether or not abnormality has occurred in the measurement (in particular, in order to confirm that these three measurement results are linear). The measurement results are not used in the following formula.

$$\alpha[ppm/°C.] = \frac{D(45°C.)[mm] - D(10°C.)[mm]}{D(10°C.)[mm]} \times \frac{1{,}000{,}000}{(45[°C.]) - (10[°C.])} \quad [\text{Math. 2}]$$

(In which D (45° C.) and D (10° C.) indicate the widths of the sample 10S at temperatures of 45° C. and 10° C., respectively.)

(Humidity Expansion Coefficient β)

The magnetic tape MT preferably has a humidity expansion coefficient β satisfying β≤5 [ppm/% RH]. When the humidity expansion coefficient β is within the above range, the change in the width of the magnetic tape MT can be further suppressed by adjusting a tension applied to the magnetic tape MT in a longitudinal direction thereof by the recording/reproducing device. The humidity expansion coefficient β is determined as follows. First, the sample 10S is manufactured in a similar manner to the method for measuring the dimensional change amount Δw, and the sample 10S is set in a measuring device similar to that in the method for measuring the dimensional change amount Δw. Thereafter, the measuring device is housed in a chamber controlled under a constant environment in which the temperature is 29° C. and the relative humidity is 24%. Next, a load of 0.2 N is applied to the sample 10S in a longitudinal direction thereof, and the sample 10S is conformed to the above environment. Thereafter, while the temperature of 29° C. is maintained, the relative humidity is changed in the order of 80%, 24%, and 10%, the widths of the sample 10S are measured at 80% and 10%, and the humidity expansion coefficient β is determined by the following formula. Note that the measurement of the width of the sample 10S at the humidity of 24% is performed in order to confirm whether or not abnormality has occurred in the measurement (in particular, in order to confirm that these three measurement results are linear). The measurement results are not used in the following formula.

$$\beta[ppm/\% \, RH] = \frac{D(80\%)[mm] - D(10\%)[mm]}{D(10\%)[mm]} \times \frac{1{,}000{,}000}{(80[\%]) - (10[\%])} \quad [\text{Math. 3}]$$

(In which D (80%) and D (10%) indicate the widths of the sample 10S at humidities of 80% and 10%, respectively)

(Poisson's Ratio ρ)

The magnetic tape MT preferably has a Poisson's ratio ρ satisfying 0.3≤ρ. When the Poisson's ratio ρ is within the above range, the change in the width of the magnetic tape MT can be further suppressed by adjusting a tension applied to the magnetic tape MT in a longitudinal direction thereof by the recording/reproducing device.

The Poisson's ratio ρ is determined as follows. First, a magnetic tape MT having a width of ½ inches is prepared and cut into a length of 150 mm to manufacture a sample. Thereafter, a mark having a size of 6 mm×6 mm is put on the central portion of the sample. Next, both end portions of the sample in a longitudinal direction thereof are chucked such that an inter-chuck distance is 100 mm, and an initial load of 2 N is applied thereto. At this time, the length of the mark in the longitudinal direction of the sample is taken as an initial length, and the width of the mark in a width direction of the sample is taken as an initial width. Subsequently, the sample is pulled at a tensile rate of 0.5 mm/min using an Instron type universal tensile testing device, and dimensional change amounts of the length of the mark in the longitudinal direction of the sample and the width of the mark in the width direction of the sample are measured with an image sensor manufactured by Keyence Corporation. Thereafter, a Poisson's ratio ρ is determined by the following formula.

$$\rho = \frac{\left\{\frac{\left(\begin{array}{c}\text{Dimensional change amount}\\ \text{of width of mark [mm]}\end{array}\right)}{(\text{Initial width [mm]})}\right\}}{\left\{\frac{\left(\begin{array}{c}\text{Dimensional change amount}\\ \text{of length of mark [mm]}\end{array}\right)}{(\text{Initial length [mm]})}\right\}} \quad [\text{Math. 4}]$$

(Elastic Limit Value $\sigma_{MD}$ in Longitudinal Direction)

An elastic limit value $\sigma_{MD}$ of the magnetic tape MT in a longitudinal direction thereof preferably satisfies 0.8 [N]≤$\sigma_{MD}$. When the elastic limit value $\sigma_{MD}$ is within the above range, the change in the width of the magnetic tape MT can be further suppressed by adjusting a tension applied to the magnetic tape MT in a longitudinal direction thereof by the recording/reproducing device. Furthermore, control on a drive side is easy. An upper limit value of the elastic limit value $\sigma_{MD}$ of the magnetic tape MT in a longitudinal direction thereof is not particularly limited, but satisfies, for example, $\sigma_{MD}$≤5.0 [N]. Preferably, the elastic limit value $\sigma_{MD}$ does not depend on a tensile rate V in elastic limit measurement. This is because with the elastic limit value $\sigma_{MD}$ not depending on the tensile rate V, a change in the width of the magnetic tape MT can be suppressed effectively without being affected by a traveling rate of the magnetic tape MT in the recording/reproducing device or a tension adjusting rate of the recording/reproducing device and responsiveness thereof. The elastic limit value $\sigma_{MD}$ is set to a desired value, for example, by selecting curing condition of the base layer 42, the recording layer 43, and the back layer 44 and selecting a material of the substrate 41. For example, as curing time of a base layer forming coating material, a recording layer forming coating material, and a back layer forming coating material is lengthened, or as a curing temperature is raised, a reaction between a binder and a curing agent contained in each of these coating materials is accelerated. This improves elastic characteristic and the elastic limit value $\sigma_{MD}$.

The elastic limit value $\sigma_{MD}$ is determined as follows. First, a magnetic tape MT having a width of ½ inches is prepared and cut into a length of 150 mm to manufacture a sample. Both ends of the sample in a longitudinal direction thereof are chucked in a universal tensile testing device such that an inter-chuck distance $\lambda_0$ satisfies $\lambda_0$=100 mm. Next, the sample is pulled at a tensile rate of 0.5 mm/min, and a load σ (N) against an inter-chuck distance λ (mm) is continuously measured. Subsequently, using the obtained data of λ (mm) and σ (N), a relationship between Δλ (%) and σ (N) is graphed. However, Δλ (%) is determined by the following formula.

$$\Delta\lambda\ (\%) = ((\lambda - \lambda_0)/\lambda_0) \times 100$$

Next, in the above graph, a linear region in a region of σ≥0.2 N is calculated, and a maximum load σ thereof is taken as the elastic limit value $\sigma_{MD}$ (N).

(Interlayer Friction Coefficient μ)

An interlayer friction coefficient μ between a magnetic surface and a back surface preferably satisfies 0.20≤μ≤0.80. When the interlayer friction coefficient μ is within the above range, it is possible to suppress occurrence of winding deviation when the magnetic tape MT is wound around a reel (for example, the reel 13 in FIG. 2). More specifically, when the interlayer friction coefficient μ satisfies μ<0.20, an interlayer friction between the magnetic surface of a portion located at an outermost periphery of the magnetic tape MT already wound around a cartridge reel and the back surface of the magnetic tape MT to be newly wound around the outside thereof is extremely low, and the magnetic tape MT to be newly wound easily deviates from the magnetic surface of the portion located at the outermost periphery of the magnetic tape MT already wound. Therefore, winding deviation of the magnetic tape MT occurs. Meanwhile, when the interlayer friction coefficient μ satisfies 0.80<μ, an interlayer friction between the back surface of the magnetic tape MT to be just unwound from the outermost periphery of the reel on a drive side and the magnetic surface of the magnetic tape MT located immediately below the back surface and still wound around the drive reel is extremely high, and the back surface and the magnetic surface are stuck to each other. Therefore, operation of the magnetic tape MT toward the cartridge reel is unstable, and this causes winding deviation of the magnetic tape MT.

The interlayer friction coefficient μ is determined as follows. First, a magnetic tape MT having a width of ½ inches is wound around a cylinder having a diameter of one inch with the back surface thereof facing up, and the magnetic tape MT is fixed. Next, a magnetic tape MT having a width of ½ inches is brought into contact with this cylinder at a holding angle θ (°)=180°+1° to 180°−10° such that the magnetic surface comes into contact this time. One end of the tape MT is connected to a movable strain gauge, and a tension T0=0.6 (N) is applied to the other end. When the movable strain gauge is reciprocated at 0.5 mm/s eight times, strain gauge readings T1 (N) to T8 (N) are measured in outward paths. An average value of T4 to T8 is taken as $T_{ave}$ (N). Thereafter, the interlayer friction coefficient μ is determined by the following formula.

$$\mu = \frac{1}{(\theta[°]) \times (\pi/180)} \times \log_e\left(\frac{T_{ave}\ [\text{N}]}{T_0\ [\text{N}]}\right) \quad [\text{Math. 5}]$$

(Surface Roughness $R_b$ of Back Surface)

Surface roughness of the back surface (surface roughness of the back layer 44) $R_b$ preferably satisfies $R_b$≤6.0 [nm]. When the surface roughness $R_b$ of the back surface is within the above range, electromagnetic conversion characteristics can be improved.

The surface roughness $R_b$ of the back surface is determined as follows. First, a magnetic tape MT having a width of ½ inches is prepared, and the magnetic tape MT is stuck to slide glass with the back surface thereof facing up to be used as a sample piece. Next, the surface roughness of the back surface of the sample piece is measured with a non-contact roughness meter using the following optical interference.

Device: non-contact roughness meter using optical interference
(Non-contact surface/layer cross-sectional shape measurement system VertScan R5500GL-M100-AC manufactured by Ryoka Systems Inc.)
Objective lens: 20 times (about 237 µm×178 µm field of view)
Resolution: 640 points×480 points
Measurement mode: phase
Wavelength filter: 520 nm
Surface correction: corrected with quadratic polynomial approximation surface As described above, the surface roughness is measured at five or more points in the longitudinal direction, and then an average value of the respective values of arithmetic average roughness Sa (nm) automatically calculated from surface profiles obtained at the respective points is taken as surface roughness $R_b$ (nm) of the back surface.

(Coercive Force Hc)

The magnetic tape MT has a coercive force Hc of preferably 220 kA/m or more and 310 kA/m or less, more preferably 230 kA/m or more and 300 kA/m or less, still more preferably 240 kA/m or more and 290 kA/m or less when the coercive force Hc is measured in a thickness direction (perpendicular direction) of the magnetic tape MT. When the coercive force Hc is 220 kA/m or more, the coercive force Hc is sufficiently large. Therefore, it is possible to suppress deterioration of a magnetization signal recorded in an adjacent track due to a leakage magnetic field from a recording head. Therefore, better SNR can be obtained. Meanwhile, when the coercive force Hc is 310 kA/m or less, saturation recording by a recording head is easy. Therefore, better SNR can be obtained.

The coercive force Hc is determined as follows. First, a measurement sample is cut out from a long magnetic tape MT, and an M-H loop of the entire measurement sample is measured in a thickness direction of the measurement sample (thickness direction of the magnetic tape MT) using a vibrating sample magnetometer (VSM). Next, a coating film (base layer 42, recording layer 43, or the like) is wiped away using acetone, ethanol, or the like. Only the substrate 41 is left for background correction. An M-H loop of the substrate 41 is measured in a thickness direction of the substrate 41 (thickness direction of the magnetic tape MT) using VSM. Thereafter, the M-H loop of the substrate 41 is subtracted from the M-H loop of the entire measurement sample to obtain an M-H loop after background correction. A coercive force Hc is determined from the obtained M-H loop. Note that each of the measurements of the M-H loop is performed at 25° C. Furthermore, when the M-H loop is measured in the thickness direction (perpendicular direction) of the magnetic tape MT, "demagnetizing field correction" is not performed. Furthermore, according to the sensitivity of VSM used, a plurality of samples to be measured may be stacked on each other to measure the M-H loop.

(Ratio R Between Coercive Force Hc (50) and Coercive Force Hc (25))

A ratio R (=(Hc (50)/Hc (25))×100) between the coercive force Hc (50) measured in the thickness direction (perpendicular direction) of the magnetic tape MT at 50° C. and the coercive force Hc (25) measured in the thickness direction of the magnetic tape MT at 25° C. is preferably 95% or more, more preferably 96% or more, still more preferably 97% or more, and particularly preferably 98% or more. When the ratio R is 95% or more, temperature dependency of the coercive force Hc is small, and deterioration of SNR under a high temperature environment can be suppressed.

The coercive force Hc (25) is determined in a similar manner to the above method for measuring a coercive force Hc. Furthermore, the coercive force Hc (50) is determined in a similar manner to the above method for measuring a coercive force Hc except that the M-H loops of both the measurement sample and the substrate 41 are measured at 50° C.

(Squareness Ratio S1 Measured in Traveling Direction)

The magnetic tape MT has a squareness ratio S1 of preferably 35% or less, more preferably 30% or less, still more preferably 25% or less, particularly preferably 20% or less, most preferably 15% or less when the squareness ratio S1 is measured in a traveling direction of the magnetic tape MT. When the squareness ratio S1 is 35% or less, perpendicular orientation of magnetic powder is sufficiently high. Therefore, better SNR can be obtained. Therefore, better electromagnetic conversion characteristics can be obtained. Furthermore, the shape of a servo signal is improved, and it is easier to control a drive side.

The squareness ratio S1 is determined as follows. First, a measurement sample is cut out from a long magnetic tape MT, and an M-H loop of the entire measurement sample corresponding to a traveling direction (longitudinal direction) of the magnetic tape MT is measured using VSM. Next, a coating film (base layer 42, recording layer 43, or the like) is wiped away using acetone, ethanol, or the like. Only the substrate 41 is left for background correction. An M-H loop of the substrate 41 corresponding to a traveling direction of the substrate 41 (traveling direction of the magnetic tape MT) is measured using VSM. Thereafter, the M-H loop of the substrate 41 is subtracted from the M-H loop of the entire measurement sample to obtain an M-H loop after background correction. The squareness ratio S1 (%) is calculated by putting saturation magnetization Ms (emu) and residual magnetization Mr (emu) of the obtained M-H loop into the following formula. Note that each of the measurements of the M-H loop is performed at 25° C. Furthermore, according to the sensitivity of VSM used, a plurality of samples to be measured may be stacked on each other to measure the M-H loop.

$$\text{Squareness ratio } S1(\%)=(Mr/Ms)\times 100$$

(Squareness Ratio S2 Measured in Perpendicular Direction)

The magnetic tape MT has a squareness ratio S2 of preferably 65% or more, more preferably 70% or more, still more preferably 75% or more, particularly preferably 80% or more, most preferably 85% or more when the squareness ratio S2 is measured in a perpendicular direction (thickness direction) of the magnetic tape MT. When the squareness ratio S2 is 65% or more, perpendicular orientation of magnetic powder is sufficiently high. Therefore, better SNR can be obtained. Therefore, better electromagnetic conversion characteristics can be obtained. Furthermore, the shape of a servo signal is improved, and it is easier to control a drive side. The squareness ratio S2 is determined in a similar manner to the squareness ratio S1 except that the M-H loop is measured in the perpendicular direction (thickness direction) of the magnetic tape MT and the substrate 41. Note that in the measurement of the squareness ratio S2, when the M-H loop is measured in the perpendicular direction of the magnetic tape MT, "demagnetizing field correction" is not performed.

The squareness ratios S1 and S2 are set to desired values, for example, by adjusting the intensity of a magnetic field applied to a recording layer forming coating material, application time of the magnetic field to the recording layer forming coating material, a dispersed state of magnetic powder in the recording layer forming coating material, the concentration of a solid content in the recording layer forming coating material, and the like. Specifically, for example, as the intensity of the magnetic field is increased, the squareness ratio S1 becomes smaller, whereas the squareness ratio S2 becomes larger. Furthermore, as the application time of the magnetic field is increased, the squareness ratio S1 becomes smaller, whereas the squareness ratio S2 becomes larger. Furthermore, as the dispersed state of the magnetic powder is improved, the squareness ratio S1 becomes smaller, whereas the squareness ratio S2 becomes larger. Furthermore, as the concentration of the solid content decreases, the squareness ratio S1 becomes smaller, whereas the squareness ratio S2 becomes larger. Note that the adjustment methods may be used singly or in combination of two or more thereof (Hc2/Hc1)

A ratio Hc2/Hc1 between a coercive force Hc1 in a perpendicular direction and a coercive force Hc2 in a longitudinal direction satisfies Hc2/Hc1≤0.8, preferably Hc2/Hc1≤0.75, more preferably Hc2/Hc1≤0.7, still more preferably Hc2/Hc1≤0.65, particularly preferably Hc2/Hc1≤0.6. With the coercive forces Hc1 and Hc2 satisfying Hc2/Hc1≤0.8, the degree of perpendicular orientation of the magnetic powder can be increased. Therefore, a magnetization transition width can be reduced, and a high output signal can be obtained at the time of signal reproduction. Therefore, electromagnetic conversion characteristics (for example, C/N) can be improved. Note that as described above, with a small value of Hc2, magnetization reacts with high sensitivity due to a magnetic field in a perpendicular direction from a recording head. Therefore, a good recording pattern can be formed.

In a case where the ratio Hc2/Hc1 satisfies Hc2/Hc1≤0.8, the average thickness of the recording layer 43 is particularly effectively 90 nm or less. When the average thickness of the recording layer 43 exceeds 90 nm, in a case where a ring type head is used as a recording head, a lower region (region on the base layer 42 side) of the recording layer 43 is magnetized in a longitudinal direction thereof, and it may be impossible to magnetize the recording layer 43 uniformly in a thickness direction thereof. Therefore, even when the ratio Hc2/Hc1 satisfies Hc2/Hc1≤0.8 (that is, even when the degree of perpendicular orientation of magnetic powder is increased), it may be impossible to improve electromagnetic conversion characteristics (for example, C/N). A lower limit value of Hc2/Hc1 is not particularly limited, but satisfies, for example, 0.5≤Hc2/Hc1. Note that Hc2/Hc1 represents the degree of perpendicular orientation of magnetic powder. The smaller the value of Hc2/Hc1 is, the higher the degree of perpendicular orientation of the magnetic powder is.

(SFD)

In a switching field distribution (SFD) curve of the magnetic tape MT, a peak ratio X/Y between a height X of a main peak and a height Y of a sub-peak near the magnetic field zero is preferably 3.0 or more, more preferably 5.0 or more, still more preferably 7.0 or more, particularly preferably 10.0 or more, and most preferably 20.0 or more. When the peak ratio X/Y is 3.0 or more, it is possible to suppress inclusion of a large amount of low coercive force components unique to ε iron oxide (for example, soft magnetic particles or superparamagnetic particles) in magnetic powder in addition to ε iron oxide particles contributing to actual recording. Therefore, it is possible to suppress deterioration of a magnetization signal recorded in an adjacent track due to a leakage magnetic field from a recording head. Therefore, better SNR can be obtained. An upper limit value of the peak ratio X/Y is not particularly limited, but is for example, 100 or less.

The peak ratio X/Y is determined as follows. First, in a similar manner to the above method for measuring a coercive force Hc, an M-H loop after background correction is obtained. Next, an SFD curve is calculated from the obtained M-H loop. For calculating the SFD curve, a program attached to a measuring machine may be used, or another program may be used. By taking an absolute value of a point where the calculated SFD curve crosses the Y axis (dM/dH) as "Y" and taking the height of a main peak seen near a coercive force Hc in the M-H loop as "X", the peak ratio X/Y is calculated. Note that the M-H loop is measured at 25° C. in a similar manner to the above method for measuring a coercive force Hc. Furthermore, when the M-H loop is measured in the thickness direction (perpendicular direction) of the magnetic tape MT, "demagnetizing field correction" is not performed. Furthermore, according to the sensitivity of VSM used, a plurality of samples to be measured may be stacked on each other to measure the M-H loop.

(Activation Volume $V_{act}$)

An activation volume $V_{act}$ is preferably 8000 nm$^3$ or less, more preferably 6000 nm$^3$ or less, still more preferably 5000 nm$^3$ or less, particularly preferably 4000 nm$^3$ or less, and most preferably 3000 nm$^3$ or less. When the activation volume $V_{act}$ is 8000 nm$^3$ or less, a dispersed state of magnetic powder is good. Therefore, a bit inversion region can be made steep, and it is possible to suppress deterioration of a magnetization signal recorded in an adjacent track due to a leakage magnetic field from a recording head. Therefore, it may be impossible to obtain better SNR.

The activation volume $V_{act}$ is determined by the following formula derived by Street & Woolley.

$$V_{act} (\text{nm}^3) = k_B \times T \times X_{irr} / (\mu_0 \times Ms \times S)$$

(In which $k_B$: Boltzmann's constant (1.38×10$^{-23}$ J/K), T: temperature (K), $X_{irr}$: irreversible susceptibility, $\mu_0$: vacuum permeability, S: magnetic viscosity coefficient, Ms: saturation magnetization (emu/cm$^3$))

The irreversible susceptibility $X_{irr}$, the saturation magnetization Ms, and the magnetic viscosity coefficient S to be put in the above formula are determined using VSM as follows. Note that a measurement direction using VSM is a thickness direction (perpendicular direction) of a magnetic tape MT. Furthermore, the measurement using VSM is performed at 25° C. for a measurement sample cut out from a long magnetic tape MT. Furthermore, when the M-H loop is measured in the thickness direction (perpendicular direction) of the magnetic tape MT, "demagnetizing field correction" is not performed. Furthermore, according to the sensitivity of VSM used, a plurality of samples to be measured may be stacked on each other to measure the M-H loop.

(Irreversible Susceptibility $X_{irr}$)

The irreversible susceptibility $X_{irr}$ is defined as an inclination near a residual coercive force Hr in the inclination of a residual magnetization curve (DCD curve). First, a magnetic field of −1193 kA/m (15 kOe) is applied to the entire magnetic tape MT, and the magnetic field is returned to zero to obtain a residual magnetization state. Thereafter, a magnetic field of about 15.9 kA/m (200 Oe) is applied in the opposite direction to return the magnetic field to zero again, and a residual magnetization amount is measured. Thereafter, similarly, measurement of applying a magnetic field larger than the previously applied magnetic field by 15.9 kA/m to return the magnetic field to zero is repeated, and a residual magnetization amount is plotted with respect to an applied magnetic field to form a DCD curve. From the obtained DCD curve, a point where the magnetization amount is zero is taken as a residual coercive force Hr, the DCD curve is differentiated, and the inclination of the DCD curve at each magnetic field is determined. In the inclination of this DCD curve, an inclination near the residual coercive force Hr is $X_{irr}$.

(Saturation Magnetization Ms)

First, the M-H loop of the entire magnetic tape MT (measurement sample) is measured in a thickness direction of the magnetic tape MT. Next, a coating film (base layer 42, recording layer 43, or the like) is wiped away using acetone, ethanol, or the like. Only the substrate 41 is left for background correction. An M-H loop of the substrate 41 is measured in a thickness direction thereof similarly. Thereafter, the M-H loop of the substrate 41 is subtracted from the M-H loop of the entire magnetic tape MT to obtain an M-H loop after background correction. Ms (emu/cm$^3$) is calculated from a value of saturation magnetization Ms (emu) of the obtained M-H loop and the volume (cm$^3$) of the recording layer 43 in the measurement sample. Note that the volume of the recording layer 43 is determined by multiplying the area of the measurement sample by an average thickness of the recording layer 43. Furthermore, according to the sensitivity of VSM used, a plurality of samples to be measured may be stacked on each other to measure the M-H loop. A method for calculating the average thickness of the recording layer 43 necessary for calculating the volume of the recording layer 43 will be described later.

(Magnetic Viscosity Coefficient S)

First, a magnetic field of −1193 kA/m (15 kOe) is applied to the entire magnetic tape MT (measurement sample), and the magnetic field is returned to zero to obtain a residual magnetization state. Thereafter, a magnetic field equivalent to the value of the residual coercive force Hr obtained from the DCD curve is applied in the opposite direction. A magnetization amount is continuously measured at constant time intervals for 1000 seconds in a state where a magnetic field is applied. A magnetic viscosity coefficient S is calculated by comparing a relationship between time t and a magnetization amount M(t), obtained in this way, with the following formula.

$$M(t)=M0+S\times\ln(t)$$

(In which M(t): magnetization amount at time t, M0: initial magnetization amount, S: magnetic viscosity coefficient, ln(t): natural logarithm of time)

(BET Specific Surface Area)

A lower limit value of the BET specific surface area of the entire magnetic tape MT in a state where a lubricant has been removed is 3.5 m$^2$/mg or more, preferably 4 m$^2$/mg or more, more preferably 4.5 m$^2$/mg or more, and still more preferably 5 m$^2$/mg or more. When the lower limit value of the BET specific surface area is 3.5 m$^2$/mg or more, even after recording or reproduction is performed repeatedly (that is, even after the magnetic tape MT repeatedly travels while a magnetic head is in contact with a surface of the magnetic tape MT), it is possible to suppress a decrease in the amount of a lubricant supplied to a space between the recording layer 43 and the magnetic head. Therefore, an increase in the coefficient of dynamic friction can be suppressed.

An upper limit value of the BET specific surface area of the entire magnetic tape MT in a state where a lubricant has been removed is preferably 7 m$^2$/mg or less, more preferably 6 m$^2$/mg or less, and still more preferably 5.5 m$^2$/mg or less. When the upper limit value of the BET specific surface area is 7 m$^2$/mg or less, a lubricant can be sufficiently supplied without being depleted even after traveling a large number of times. Therefore, an increase in the coefficient of dynamic friction can be suppressed.

An average pore diameter of the entire magnetic tape MT determined by a BJH method is 6 nm or more and 11 nm or less, preferably 7 nm or more and 10 nm or less, and more preferably 7.5 nm or more and 10 nm or less. When the average pore diameter is 6 nm or more and 11 nm or less, the above-described effect of suppressing the increase in the coefficient of dynamic friction can be further improved.

The BET specific surface area and a pore distribution (pore volume and pore diameter of maximum pore volume at desorption) are determined as follows. First, a magnetic tape MT is washed with hexane for 24 hours, and then cut into a size of 0.1265 m$^2$ to manufacture a measurement sample. Next, the BET specific surface area is determined using a specific surface area/pore distribution measuring device. Furthermore, a pore distribution (pore volume and pore diameter of maximum pore volume at desorption) is determined by a BJH method. A measuring device and measuring conditions are indicated below.

Measuring device: 3 FLEX manufactured by Micromeritics Instrument Corp.

Measurement adsorbate: N$_2$ gas

Measurement pressure range (p/p0): 0 to 0.995

(Arithmetic Average Roughness Ra)

Arithmetic average roughness Ra of a magnetic surface is preferably 2.5 nm or less, and more preferably 2.0 nm or less. When Ra is 2.5 nm or less, better SNR can be obtained.

The arithmetic average roughness Ra is determined as follows. First, a surface on which the recording layer 43 is disposed is observed using an atomic force microscope (AFM) (Dimension Icon manufactured by Bruker) to acquire a cross-sectional profile. Next, an arithmetic average roughness Ra is determined from the acquired cross-sectional profile according to JIS B0601:2001.

[Method for Manufacturing Magnetic Tape]

Next, an example of a method for manufacturing a magnetic tape MT having the above-described configuration will be described. First, by kneading and dispersing non-magnetic powder, a binder, and the like in a solvent, a base layer forming coating material is prepared. Next, by kneading and dispersing magnetic powder, a binder, and the like in a solvent, a recording layer forming coating material is prepared. For preparing the recording layer forming coating material and the base layer forming coating material, for example, the following solvents, dispersing devices, and kneading devices can be used.

Examples of the solvent used for preparing the above-described coating material include a ketone-based solvent such as acetone, methyl ethyl ketone, methyl isobutyl ketone, or cyclohexanone, an alcohol-based solvent such as methanol, ethanol, or propanol, an ester-based solvent such as methyl acetate, ethyl acetate, butyl acetate, propyl acetate, ethyl lactate, or ethylene glycol acetate, an ether-based solvent such as diethylene glycol dimethyl ether, 2-ethoxyethanol, tetrahydrofuran, or dioxane, an aromatic hydrocarbon-based solvent such as benzene, toluene, or xylene, and a halogenated hydrocarbon-based solvent such as methylene chloride, ethylene chloride, carbon tetrachloride, chloroform, or chlorobenzene. These solvents may be used singly, or may be used in a mixture thereof appropriately.

Examples of a kneading device used for preparing the above-described coating material include a continuous twin-screw kneading machine, a continuous twin-screw kneading machine capable of performing dilution in multiple stages, a kneader, a pressure kneader, and a roll kneader, but are not particularly limited to these devices. Furthermore, examples of a dispersing device used for preparing the above-described coating material include a roll mill, a ball mill, a horizontal sand mill, a vertical sand mill, a spike mill, a pin mill, a tower mill, a pearl mill (for example, "DCP mill" manufactured by Eirich Co., Ltd.), a homogenizer, and an ultrasonic wave dispersing machine, but are not particularly limited to these devices.

Next, a base layer forming coating material is applied to one main surface of the substrate 41 and dried to form the base layer 42. Subsequently, by applying a recording layer forming coating material onto the base layer 42 and drying the recording layer forming coating material, the recording layer 43 is formed on the base layer 42. Note that during drying, magnetic powder is subjected to magnetic field orientation in a thickness direction of the substrate 41 by, for example, a solenoid coil. Furthermore, during drying, the magnetic powder may be subjected to magnetic field orientation in a traveling direction (longitudinal direction) of the substrate 41 by, for example, a solenoid coil, and then may be subjected to magnetic field orientation in a thickness direction of the substrate 41. After the formation of the recording layer 43, the back layer 44 is formed on the other main surface of the substrate 41. As a result, a magnetic tape MT is obtained.

Thereafter, the obtained magnetic tape MT is rewound around a large diameter core and subjected to a curing treatment. Finally, the magnetic tape MT is subjected to a calendering treatment, and then cut into a predetermined width (for example, width of ½ inches). As a result, the target long and thin magnetic tape MT is obtained. [Configuration of Recording/Reproducing Device]

The recording/reproducing device 50 performs recording and reproduction of the magnetic tape MT having the above-described configuration. The recording/reproducing device 50 can adjust a tension applied to the magnetic tape MT in a longitudinal direction thereof. Furthermore, the recording/reproducing device 50 can load the cartridge 10 thereon. Here, a case where the recording/reproducing device 50 can load one cartridge 10 thereon will be described in order to facilitate the description. However, the recording/reproducing device 50 can load a plurality of cartridges 10 thereon.

The recording/reproducing device 50 is connected to information processing devices such as a server 71 and a personal computer (hereinafter referred to as "PC") 72 through a network 70, and data supplied from these information processing devices can be recorded in the cartridge 10. Furthermore, in response to a request from these information processing devices, data can be reproduced from the cartridge 10 and can be supplied to these information processing devices. The shortest recording wavelength of the recording/reproducing device 50 is preferably 100 nm or less, more preferably 75 nm or less, still more preferably 60 nm or less, and particularly preferably 50 nm or less.

As illustrated in FIG. 1, the recording/reproducing device 50 includes a spindle 51, a reel 52 on the recording/reproducing device 50 side, a spindle drive device 53, a reel drive device 54, a plurality of guide rollers 55, a head unit 56, a reader/writer 57 as a communication unit, a communication interface (hereinafter, I/F) 58, and a control device 59.

The spindle 51 can mount the cartridge 10 thereon. A V-shaped servo pattern is recorded in advance as a servo signal on the magnetic tape MT. The reel 52 can fix a tip (leader pin 22) of the magnetic tape MT pulled out of the cartridge 10 through a tape loading mechanism (not illustrated).

The spindle drive device 53 rotates the spindle 51 in response to an instruction from the control device 59. The reel drive device 54 rotates the reel 52 in response to an instruction from the control device 59. The plurality of guide rollers 55 guides traveling of the magnetic tape MT such that a tape path formed between the cartridge 10 and the reel 52 has a predetermined relative positional relationship with respect to the head unit 56.

When data is recorded on the magnetic tape MT or data is reproduced from the magnetic tape MT, the spindle 51 and the reel 52 are rotationally driven by the spindle drive device 53 and the reel drive device 54, and the magnetic tape MT travels. The magnetic tape MT can be reciprocated in a forward direction (a direction from the cartridge 10 side to the reel 52 side) and a backward direction (a direction from the reel 52 side to the cartridge 10 side).

In the present embodiment, a tension applied to the magnetic tape MT in a longitudinal direction thereof can be adjusted at the time of data recording or at the time of data reproduction by controlling rotation of the spindle 51 by the spindle drive device 53 and controlling rotation of the reel 52 by the reel drive device 54. Note that the adjustment of a tension applied to the magnetic tape MT may be performed by control of movement of the guide rollers 55 instead of or in addition to the control of rotation of the spindle 51 and the reel 52.

The reader/writer 57 can write first information and second information in the cartridge memory 11 in response to an instruction from the control device 59. Furthermore, the reader/writer 57 can read out the first information and the second information from the cartridge memory 11 in response to an instruction from the control device 59. As a communication method between the reader/writer 57 and the cartridge memory 11, for example, an ISO 14443 method is adopted. The second information includes tension adjustment information. The tension adjustment information is an example of data recording time information.

The control device 59 includes, for example, a control unit, a storage unit, and a communication unit. The control unit is constituted by, for example, a central processing unit (CPU), and controls each unit of the recording/reproducing device 50 in accordance with a program stored in the storage unit. For example, the control device 59 causes the head unit 56 to record a data signal supplied from an information processing device such as the server 71 or the PC 72 on the magnetic tape MT in response to a request from the information processing device.

Furthermore, the control device 59 causes the head unit 56 to reproduce the data signal recorded on the magnetic tape MT in response to a request from an information processing device such as the server 71 or the PC 72 and supplies the data signal to the information processing device. The storage unit includes a non-volatile memory in which various kinds of data and various programs are recorded, and a volatile memory used as a work area of the control unit. The various programs may be read from a portable recording medium such as an optical disk or a portable storage device such as a semiconductor memory, or may be downloaded from a server device on a network.

The control device 59 causes the head unit 56 to read servo signals recorded in two adjacent servo bands SB at the time of recording data on the magnetic tape MT or at the time of reproducing data from the magnetic tape MT. The control device 59 controls the position of the head unit 56 such that the head unit 56 follows a servo pattern using servo signals read from the two servo bands SB.

The control device 59 determines a distance (a distance in a width direction of the magnetic tape MT) d1 between two adjacent servo bands SB at the time of recording data on the magnetic tape MT from a reproduction waveform of the servo signals read from the two adjacent servo bands SB. Then, the reader/writer 57 writes the determined distance in the memory 36.

The control device 59 determines a distance (a distance in a width direction of the magnetic tape MT) d2 between two adjacent servo bands SB from a reproduction waveform of the servo signals read from the two adjacent servo bands SB at the time of reproducing data from the magnetic tape MT. At the same time, the control device 59 causes the reader/writer 57 to read out the distance d1 between the two adjacent servo bands SB, determined at the time of recording data on the magnetic tape MT, from the memory 36. The control device 59 controls rotation of the spindle drive device 53 and the reel drive device 54 and adjusts a tension applied to the magnetic tape MT in a longitudinal direction thereof such that a difference Δd between the distance d1 between the servo bands SB determined at the time of recording data on the magnetic tape MT and the distance d2 between the servo bands SB determined at the time of reproducing data from the magnetic tape MT is within a prescribed range. The control of the tension adjustment is performed, for example, by feedback control.

The head unit 56 can record data on the magnetic tape MT in response to an instruction from the control device 59. Furthermore, the head unit 56 can reproduce data recorded on the magnetic tape MT in response to an instruction from the control device 59. The head unit 56 includes, for example, two servo read heads and a plurality of data write/read heads.

The servo read heads read a magnetic field generated from a servo signal recorded on the magnetic tape MT using a magneto resistive (MR) element or the like, and can thereby reproduce the servo signal. A distance between the two servo read heads in a width direction thereof is substantially the same as a distance between two adjacent servo bands SB.

The data write/read heads are disposed at regular intervals in a direction from one servo read head to the other servo read head at positions where the data write/read heads are sandwiched between the two servo read heads. The data write/read heads can record data on the magnetic tape MT by a magnetic field generated from a magnetic gap. Furthermore, the data write/read heads read a magnetic field generated from data recorded on the magnetic tape MT using an MR element or the like, and can thereby reproduce the data.

The communication I/F 58 is for communicating with an information processing device such as the server 71 or the PC 72, and is connected to the network 70.

[Operation of Recording/Reproducing Device at the Time of Data Recording]

Figure 7:
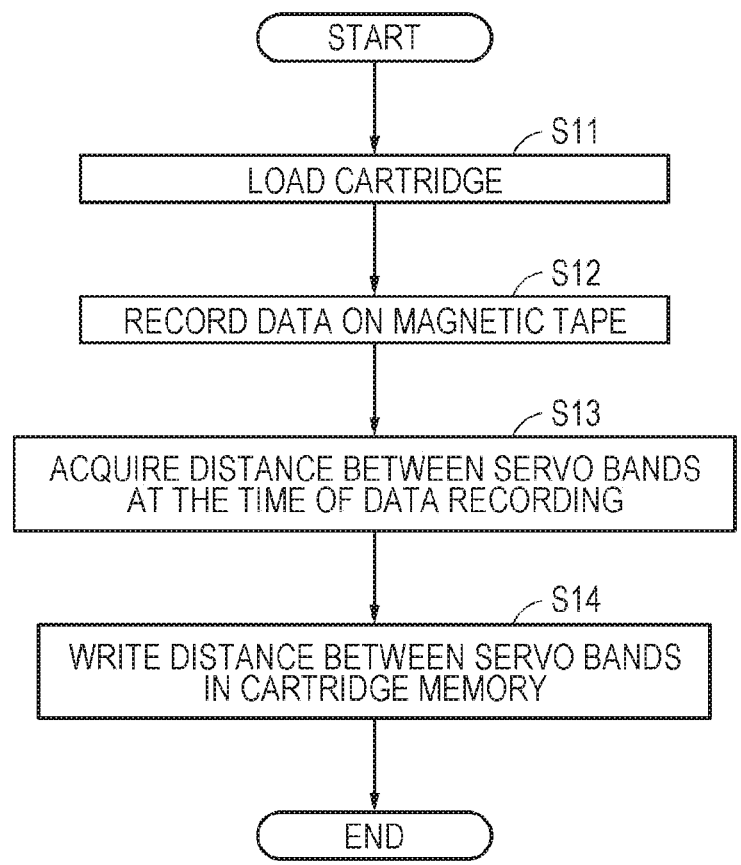
FIG. 7 is a flowchart for explaining an example of operation of a recording/reproducing device at the time of data recording.

Hereinafter, an example of operation of the recording/reproducing device 50 at the time of data recording will be described with reference to FIG. 7.

First, the control device 59 loads the cartridge 10 on the recording/reproducing device 50 (step S11). Next, the control device 59 controls rotation of the spindle 51 and the reel 52 and causes the magnetic tape MT to travel while applying a prescribed tension to the magnetic tape MT in a longitudinal direction thereof. Then, the control device 59 causes a servo read head of the head unit 56 to read a servo signal, and causes a data write/read head of the head unit 56 to record data on the magnetic tape MT (step S12).

At this time, the head unit 56 records data on a data band DB with the data write/read head of the head unit 56 while tracing two adjacent servo bands SB with the two servo read heads of the head unit 56.

Next, the control device 59 determines a distance d1 between two adjacent servo bands SB at the time of data recording from a reproduction waveform of a servo signal read by a servo read head of the head unit 56 (step S13). Next, the control device 59 causes the reader/writer 57 to write the distance d1 between the servo bands SB at the time of data recording in the cartridge memory 11 (step S14). The control device 59 may continuously measure the distance d1 between the servo bands SB and write distance d1 in the cartridge memory 11, or may measure the distance d1 between the servo bands SB at regular intervals and write the distance d1 in the cartridge memory 11. In a case where the distance d1 between the servo bands SB is measured at regular intervals and written in the cartridge memory 11, the amount of information written in the memory 36 can be reduced.

[Operation of Recording/Reproducing Device at the Time of Data Reproduction]

Figure 8:
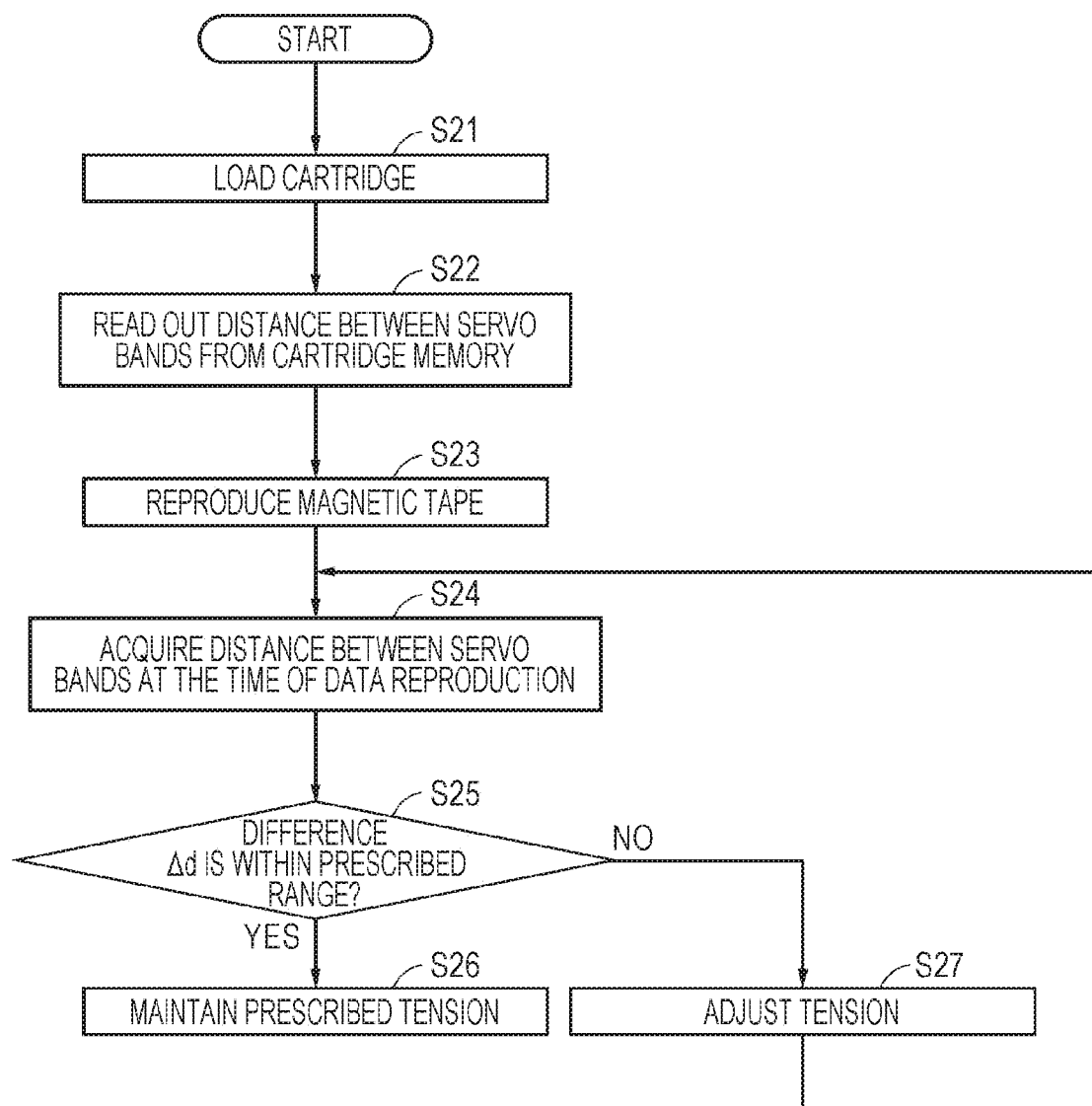
FIG. 8 is a flowchart for explaining an example of operation a recording/reproducing device at the time of data reproduction.

Hereinafter, an example of operation of the recording/reproducing device 50 at the time of data reproduction will be described with reference to FIG. 8.

First, the control device 59 loads the cartridge 10 on the recording/reproducing device 50 (step S21). Next, the control device 59 causes the reader/writer 57 to read out a distance d1 between servo bands at the time of recording from the cartridge memory 11 (step S22).

Next, the control device 59 controls rotation of the spindle 51 and the reel 52 and causes the magnetic tape MT to travel while applying a prescribed tension to the magnetic tape MT in a longitudinal direction thereof. Then, the control device 59 causes a servo read head of the head unit 56 to read a servo signal, and causes a data write/read head of the head unit 56 to reproduce data from the magnetic tape MT (step S23).

Next, the control device 59 calculates a distance d2 between two adjacent servo bands SB at the time of data reproduction from a reproduction waveform of a servo signal read by a servo read head of the head unit 56 (step S24).

Next, the control device 59 determines whether or not a difference Δd between the distance d1 between the servo bands read in step S22 and the distance d2 between the servo bands SB calculated in step S24 is within a prescribed range (step S25).

In step S25, in a case where it is determined that the difference Δd is within the prescribed range, the control device 59 controls rotation of the spindle 51 and the reel 52 so as to maintain a prescribed tension (step S26).

Meanwhile, in step S25, in a case where it is determined that the difference Δd is not within a prescribed range, the control device 59 controls rotation of the spindle 51 and the reel 52 so as to reduce the difference Δd, adjusts a tension applied to the traveling magnetic tape MT, and returns the process to step S24 (step S27).

[Effect]

As described above, in the first embodiment, the average thickness $t_T$ of the magnetic tape MT satisfies $t_T \leq 5.5$ [µm], and the dimensional change amount $\Delta w$ of the magnetic tape MT in a width direction thereof with respect to a tension change of the magnetic tape MT in a longitudinal direction thereof satisfies 650 [ppm/N]$\leq \Delta w$. Furthermore, the memory (storage unit) 36 of the cartridge memory 11 has an area (second storage area 36B) in which width-related information related to the width of the magnetic tape MT at the time of data recording is written. As a result, even in a case where the width of the magnetic tape MT fluctuates for some reasons (for example, a change in temperature or humidity), the width-related information is used at the time of data reproduction, the recording/reproducing device 50 adjusts a tension applied to the magnetic tape MT in a longitudinal direction thereof, and a change in the width of the magnetic tape MT can be thereby suppressed. Therefore, even in a case where the width of the magnetic tape MT fluctuates for some reasons, a decrease in reliability of reproduction can be suppressed.

2. Second Embodiment

[Configuration of Recording/Reproducing Device]

Figure 9:
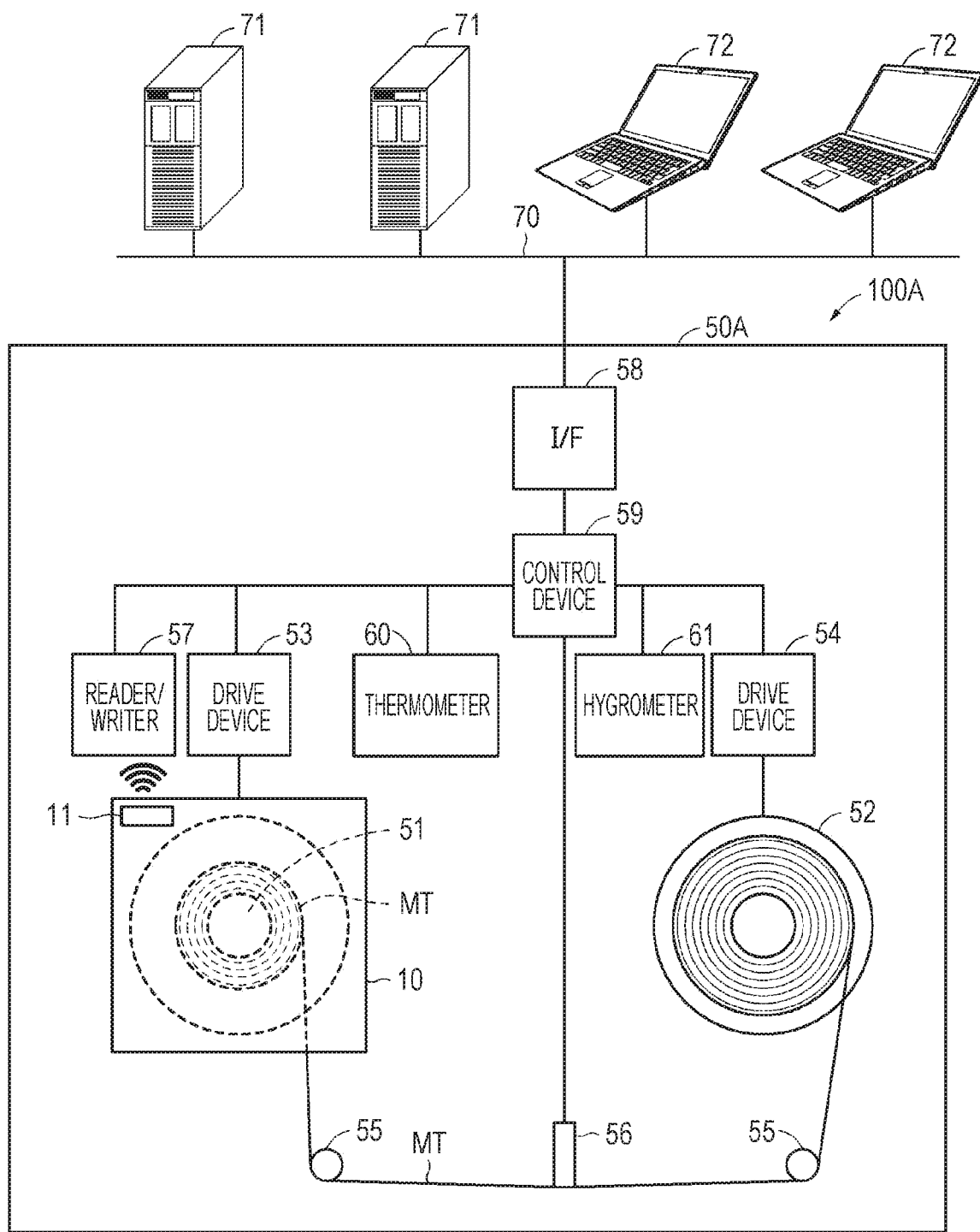
FIG. 9 is a schematic diagram illustrating an example of a configuration of a recording/reproducing system according to a second embodiment of the present disclosure.

FIG. 9 is a schematic diagram illustrating an example of a configuration of a recording/reproducing system 100A according to a second embodiment of the present disclosure. The recording/reproducing system 100A includes a cartridge 10 and a recording/reproducing device 50A.

The recording/reproducing device 50 further includes a thermometer 60 and a hygrometer 61. The thermometer 60 measures the temperature around a magnetic tape MT (cartridge 10) and outputs the temperature to a control device 59. Furthermore, the hygrometer 40 measures the humidity around the magnetic tape MT (cartridge 10) and outputs the humidity to the control device 59.

The control device 59 causes the thermometer 39 and the hygrometer 40 to measure a temperature Tm1 and a humidity H1 around the magnetic tape MT (cartridge 10) at the time of recording data on the magnetic tape MT, and writes the temperature Tm1 and the humidity H1 in a cartridge memory 11 through a reader/writer 57. The temperature Tm1 and the humidity H1 are examples of environmental information around the magnetic tape MT.

The control device 59 determines a tension Tn1 applied to the magnetic tape MT in a longitudinal direction thereof on the basis of drive data of the spindle 51 and the reel 52 at the time of recording data on the magnetic tape MT, and writes the tension Tn1 in the cartridge memory 11 through the reader/writer 57.

The control device 59 determines a distance d1 between two adjacent servo bands SB from a reproduction waveform of servo signals read from the two adjacent servo bands SB at the time of recording data on the magnetic tape MT. Then, the control device 59 calculates a width W1 of the magnetic tape MT at the time of data recording on the basis of the distance d1, and causes the reader/writer 57 to write the width W1 in a memory 36.

The control device 59 causes the thermometer 39 and the hygrometer 40 to measure a temperature Tm2 and a humidity H2 around the magnetic tape MT (cartridge 10) at the time of reproducing data from the magnetic tape MT.

The control device 59 determines a tension Tn2 applied to the magnetic tape MT in a longitudinal direction thereof on the basis of drive data of the spindle 51 and the reel 52 at the time of reproducing data from the magnetic tape MT.

The control device 59 determines a distance d2 between two adjacent servo bands SB from a reproduction waveform of servo signals read from two adjacent servo bands SB at the time of reproducing data from the magnetic tape MT. Then, the control device 59 calculates a width W2 of the magnetic tape MT at the time of data reproduction on the basis of the distance d2. The control device 59 reads the temperature Tm1, the humidity H1, the tension Tn1, and the width W1 written at the time of data recording from the cartridge memory 11 through the reader/writer 57 at the time of reproducing data from the magnetic tape MT. Then, the control device 59 controls a tension applied to the magnetic tape MT using the temperature Tm1, the humidity H1, the tension Tn1, and the width W1 at the time of recording data, and the temperature Tm2, the humidity H2, the tension Tn2, and the width W2 at the time of reproducing data such that the width W2 of the magnetic tape MT at the time of data reproduction is equal to or substantially equal to the width W1 of the magnetic tape at the time of data recording. A controller 35 of the cartridge memory 11 stores the temperature Tm1, the humidity H1, the tension Tn1, and the width W1 received from the recording/reproducing device 50A through an antenna coil 31 in the second storage area 36B of the memory 36. The controller 35 of the cartridge memory 11 reads out the temperature Tm1, the humidity H1, the tension Tn1, and the width W1 from the memory 36 in response to a request from the recording/reproducing device 50A, and transmits the temperature Tm1, the humidity H1, the tension Tn1, and the width W1 to the recording/reproducing device 50A through the antenna coil 31.

[Operation of Recording/Reproducing Device at the Time of Data Recording]

Figure 10:
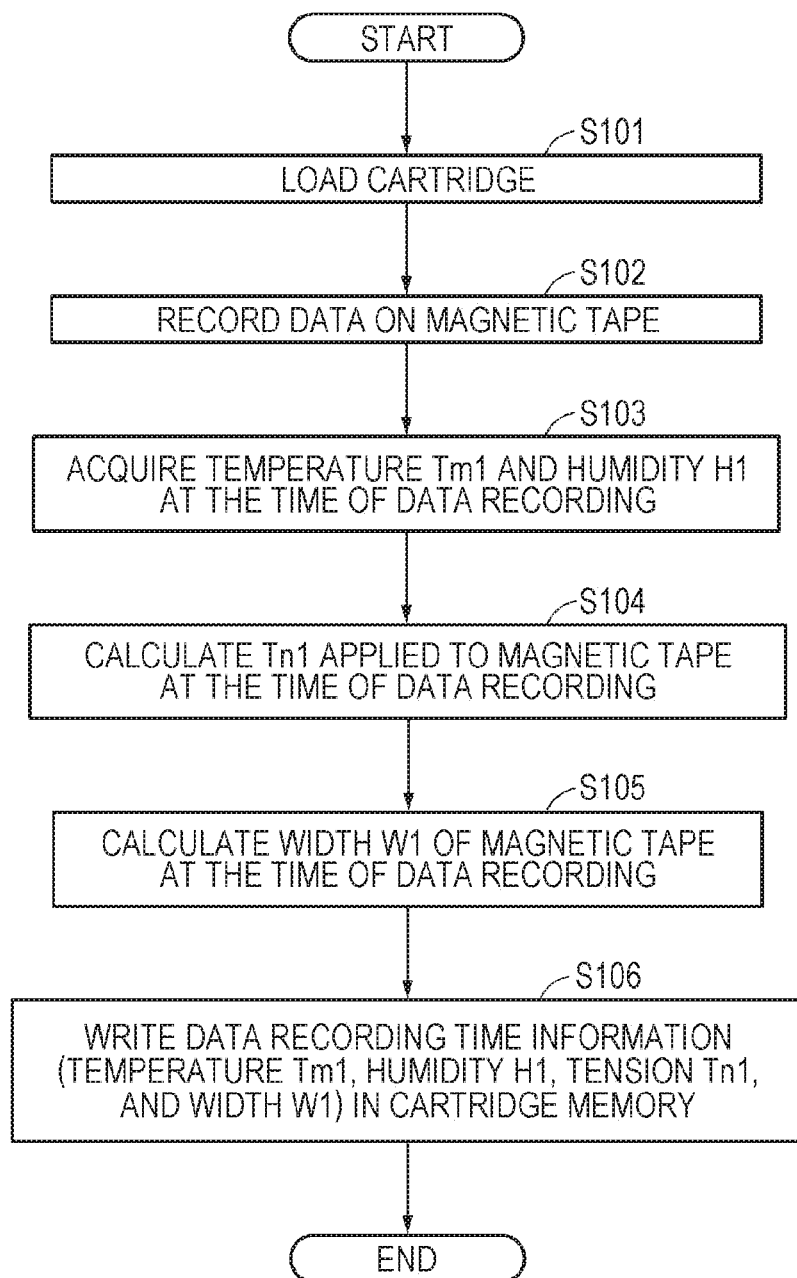
FIG. 10 is a flowchart for explaining an example of operation of a recording/reproducing device at the time of data recording.

Hereinafter, an example of operation of the recording/reproducing device 50A at the time of data recording will be described with reference to FIG. 10.

First, the control device 59 loads the cartridge 10 on the recording/reproducing device 50 (step S101). Next, the control device 59 controls rotation of the spindle 51 and the reel 52 and causes the magnetic tape MT to travel while applying a prescribed tension to the magnetic tape MT in a longitudinal direction thereof. Then, the control device 59 causes a head unit 56 to record data on the magnetic tape MT (step S102).

Next, the control device 59 acquires the temperature Tm1 and the humidity H1 (environmental information) around the magnetic tape MT at the time of data recording from the thermometer 39 and the hygrometer 40 (step S103).

Next, the control device 59 calculates the tension Tn1 applied to the magnetic tape MT in a longitudinal direction thereof at the time of data recording on the basis of drive data of the spindle 51 and the reel 52 at the time of data recording (step S104).

Next, the control device 59 determines a distance d1 between two adjacent servo bands SB from a reproduction waveform of a servo signal read by a servo read head of the head unit 56. Next, the control device 59 calculates the width W1 of the magnetic tape MT at the time of data recording on the basis of the distance d1 (step S105).

Next, the control device 59 causes the reader/writer 57 to write the temperature Tm1, the humidity H1, the tension Tn1, and the width W1 of the magnetic tape MT as data recording time information in the cartridge memory 11 (step S106).

[Operation of Recording/Reproducing Device at the Time of Data Reproduction]

Figure 11:
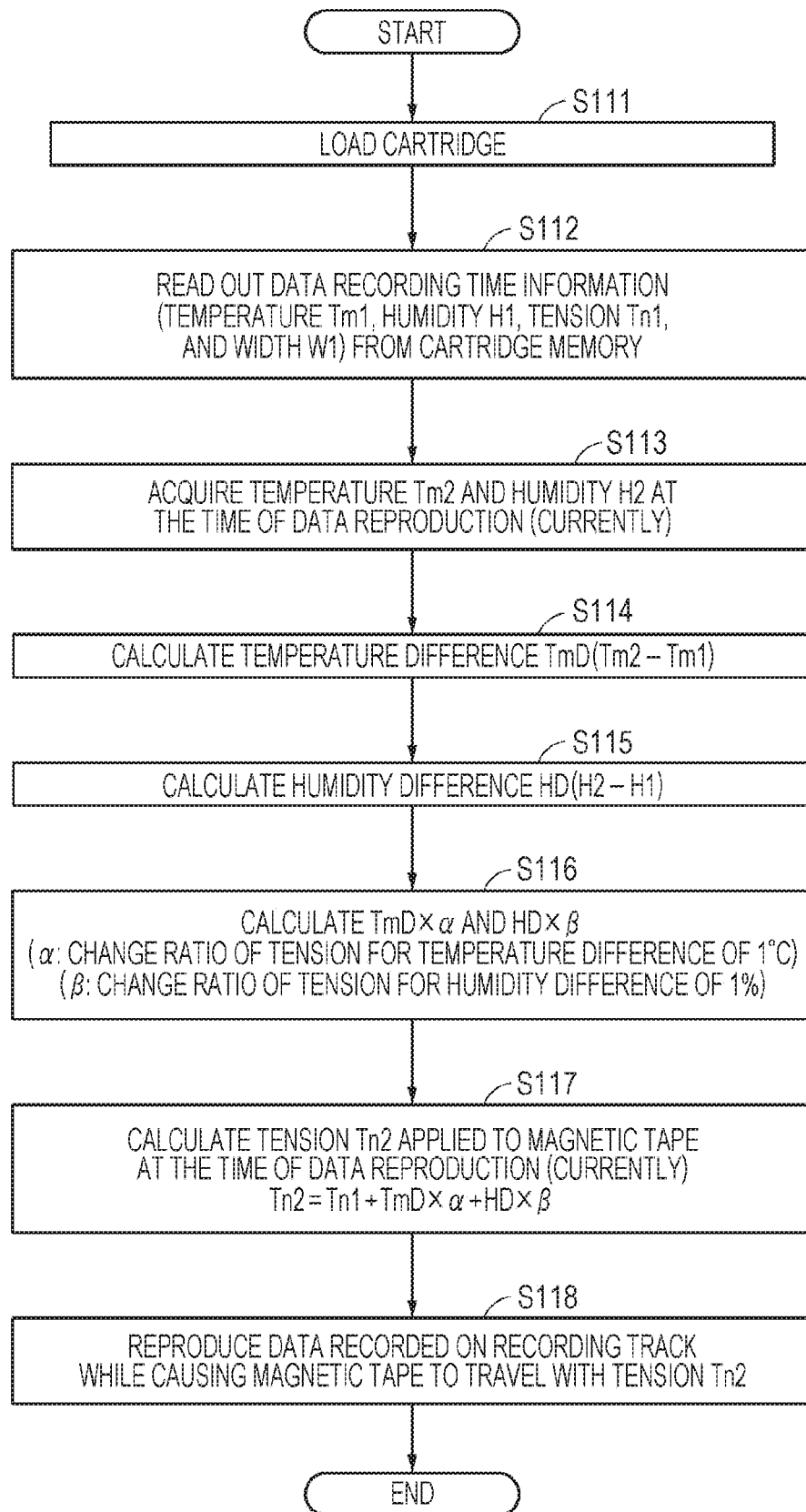
FIG. 11 is a flowchart for explaining an example of operation of a recording/reproducing device at the time of data reproduction.

Hereinafter, an example of operation of the recording/reproducing device 50A at the time of data reproduction will be described with reference to FIG. 11.

First, the control device 59 loads the cartridge 10 on the recording/reproducing device 50 (step S111). Next, the control device 59 causes the reader/writer 57 to read out data recording time information (temperature Tm1, humidity H1, tension Tn1, and width W1 of the magnetic tape MT) written in the cartridge memory 11 from the cartridge memory 11 and acquires the data recording time information (step S112). Next, the control device 59 acquires information regarding the current temperature Tm2 and information regarding the current humidity H2 around the magnetic tape MT at the time of data reproduction from the thermometer 39 and the hygrometer 40 (step S113).

Next, the control device 59 calculates a temperature difference TmD (TmD=Tm2−Tm1) between the temperature Tm1 at the time of data recording and the temperature Tm2 at the time of data reproduction (step S114). Furthermore, the control device 59 calculates a humidity difference HD (HD=H2−H1) between the humidity H1 at the time of data recording and the humidity H2 at the time of data reproduction (step S115).

Next, the control device 59 multiplies the temperature difference TmD by a coefficient α (TmD×α), and multiplies the humidity difference HD by a coefficient β (HD×β) (step S116). The coefficient α indicates how much the tension applied to the magnetic tape MT should be changed as compared to the tension Tn1 at the time of data recording for a temperature difference of 1° C. The coefficient β indicates how much the tension applied to the magnetic tape MT should be changed as compared to the tension Tn1 at the time of data recording for a humidity difference of 1%.

Next, the control device 59 adds the value of TmD×α and the value of HD×β to the tension Tn1 at the time of data recording, and thereby calculates the tension Tn2 to be applied to the magnetic tape MT in a longitudinal direction thereof at the time of data reproduction (currently) (step S117).

$$Tn2 = Tn1 + TmD \times \alpha + HD \times \beta$$

After determining the tension Tn2 applied to the magnetic tape MT at the time of data reproduction, the control device 59 controls rotation of the spindle 51 and the reel 52, and controls traveling of the magnetic tape MT such that the magnetic tape MT travels with the tension Tn2. Then, the control device 59 causes a data write/read head of the head unit 56 to reproduce data recorded in a data track Tk while causing a servo read head of the head unit 56 to read a servo signal of a servo band SB.

At this time, since the width of the magnetic tape MT is adjusted to the width at the time of data recording by adjusting a tension applied to the magnetic tape MT, the data write/read head of the head unit 56 can be accurately positioned with respect to the data track Tk. As a result, even in a case where the width of the magnetic tape MT fluctuates due to some causes (for example, fluctuation of temperature or humidity), data recorded on the magnetic tape MT can be reproduced accurately.

Note that the value of the tension Tn2 to be applied to the magnetic tape MT is higher at the time of data reproduction (currently) if the temperature at the time of data reproduction is higher than the temperature at the time of data recording. For this reason, in a case where the temperature is higher and the width of the magnetic tape MT is wider than that at the time of data recording, the width of the magnetic tape MT can be narrowed to reproduce the same width as that at the time of data reproduction.

Conversely, the value of the tension Tn2 to be applied to the magnetic tape MT is lower at the time of data reproduction (currently) if the temperature at the time of data reproduction is lower than the temperature at the time of data recording. For this reason, in a case where the temperature is lower and the width of the magnetic tape MT is narrower than that at the time of data recording, the width of the magnetic tape MT can be widened to reproduce the same width as that at the time of data reproduction.

Furthermore, the value of the tension Tn2 to be applied to the magnetic tape MT is higher at the time of data reproduction (currently) if the humidity at the time of data reproduction is higher than the humidity at the time of data recording. For this reason, in a case where the humidity is higher and the width of the magnetic tape MT is wider than that at the time of data recording, the width of the magnetic tape MT can be narrowed to reproduce the same width as that at the time of data reproduction.

Conversely, the value of the tension Tn2 to be applied to the magnetic tape MT is lower at the time of data reproduction (currently) if the humidity at the time of data reproduction is lower than the humidity at the time of data recording. For this reason, in a case where the humidity is lower and the width of the magnetic tape MT is narrower than that at the time of data recording, the width of the magnetic tape MT can be widened to reproduce the same width as that at the time of data reproduction.

Here, in order to determine the tension Tn2 to be applied to the magnetic tape MT at the time of data reproduction, in addition to the temperature Tm1, the humidity H1, and the tension Tn1 applied to the magnetic tape MT (or instead of the tension Tn1) at the time of data recording, information regarding the width W1 of the magnetic tape MT at the time of data recording may be further used.

Also in this case, similarly, the control device 59 calculates the temperature difference TmD (TmD=Tm2−Tm1) and the humidity difference HD (HD=H2−H1). Then, the control device 59 multiplies the temperature difference TmD by a coefficient γ (TmD×γ), and multiplies the humidity difference HD by a coefficient δ (HD×δ) (step S118).

Here, the coefficient γ indicates how much the width of the magnetic tape MT fluctuates for a temperature difference of 1° C. (indicates an expansion coefficient per unit length (in a width direction) based on temperature). Furthermore, the coefficient δ indicates how much the width of the magnetic tape MT fluctuates for a humidity difference of 1% (indicates an expansion coefficient per unit length (in a width direction) based on humidity).

Next, the control device 59 predicts the current width W2 of the magnetic tape MT at the time of data reproduction on the basis of the past width W1 of the magnetic tape MT at the time of data recording according to the following formula.

$$W2 = W1(1 + TmD \times \gamma + HD2 \times \delta)$$

Next, the control device 59 calculates a difference WD between the current width W2 of the magnetic tape MT at the time of data reproduction and the past width W1 of the magnetic tape MT at the time of data recording (WD=W2−W1=W1 (TmD×γ+HD2×δ)).

Then, the control device 59 multiplies the width difference WD by a coefficient ε, adds the obtained value to the tension Tn1 applied to the magnetic tape MT at the time of data recording, and calculates the tension Tn2 applied to the magnetic tape MT at the time of data reproduction.

$$Tn2 = Tn1 + WD \times \varepsilon$$

Here, the coefficient ε represents a tension applied to the magnetic tape MT in s longitudinal direction thereof, necessary to change the width of the magnetic tape MT by a unit distance. After determining the tension Tn2 applied to the magnetic tape MT at the time of data reproduction, the control device 59 controls rotation of the spindle 51 and the reel 52, and controls traveling of the magnetic tape MT such that the magnetic tape MT travels with the tension Tn2. Then, the control device 59 causes a data write/read head of the head unit 56 to reproduce data recorded in a data track Tk while causing a servo read head of the head unit 56 to read a servo signal of a servo band SB.

Even in a case where the tension Tn2 is determined by such a method, in a case where the width of the magnetic tape MT fluctuates due to some causes (for example, fluctuation of temperature or humidity), data recorded on the magnetic tape MT can be reproduced accurately.

[Effect]

As described above, in the second embodiment, since the data recording time information of the magnetic tape MT is stored in the cartridge memory 11, by using this information at the time of data reproduction, the width of the magnetic tape MT can be appropriately adjusted. Therefore, even in a case where the width of the magnetic tape MT fluctuates for some reasons, the data recorded on the magnetic tape MT can be accurately reproduced.

Furthermore, in the present embodiment, the temperature Tm1 and the humidity H1 (environmental information) around the magnetic tape MT at the time of data recording are written as data recording time information. Therefore, the fluctuation of the width of the magnetic tape MT and the fluctuation of the width of the data track Tk due to the fluctuation of the temperature and the humidity can be appropriately dealt with.

3. Modification (Modification 1)

In the above-described embodiments, the case where an ε iron oxide particle has a two-layered shell portion has been described. However, the ε iron oxide particle may have a single layer shell portion. In this case, the shell portion has a similar configuration to the first shell portion. However, an ε iron oxide particle preferably has a two-layered shell portion as in the above-described embodiments from a viewpoint of suppressing characteristic deterioration of the ε iron oxide particle.

(Modification 2)

In the above-described embodiments, the case where an ε iron oxide particle has a core-shell structure has been described. However, the ε iron oxide particle may contain an additive instead of the core-shell structure, or may have a core-shell structure and contain an additive. In this case, some of Fe atoms in the ε iron oxide particles are replaced with an additive. Even by inclusion of an additive in an ε iron oxide particle, a coercive force Hc of the entire ε iron oxide particles can be adjusted to a coercive force Hc suitable for recording. Therefore, recordability can be improved. The additive is a metal element other than iron, preferably a trivalent metal element, more preferably at least one of Al, Ga, and In, and still more preferably at least one of Al and Ga.

Specifically, the ε iron oxide containing an additive is an $\varepsilon\text{-Fe}_{2-x}M_xO_3$ crystal (in which M represents a metal element other than iron, preferably a trivalent metal element, more preferably at least one of Al, Ga, and In, and still more preferably at least one of Al and Ga, and x satisfies, for example, 0<x<1).

(Modification 3)

In the above-described embodiments, the case where magnetic powder contains powder of ε iron oxide particles has been described. However, the magnetic powder may contain powder of nanoparticles containing hexagonal ferrite (hereinafter referred to as "hexagonal ferrite particles") instead of the powder of ε iron oxide particles. The hexagonal ferrite particle has, for example, a hexagonal plate shape or a substantially hexagonal plate shape. The hexagonal ferrite preferably contains at least one of Ba, Sr, Pb, and Ca, more preferably at least one of Ba and Sr. Specifically, the hexagonal ferrite may be, for example, barium ferrite or strontium ferrite. The barium ferrite may further contain at least one of Sr, Pb, and Ca in addition to Ba. The strontium ferrite may further contain at least one of Ba, Pb, and Ca in addition to Sr. More specifically, the hexagonal ferrite has an average composition represented by a general formula $NiFe_{12}O_{19}$. However, M represents at least one metal of Ba, Sr, Pb, and Ca, preferably at least one metal of Ba and Sr. M may represent a combination of Ba and one or more metals selected from the group consisting of Sr, Pb, and Ca. Furthermore, M may represent a combination of Sr and one or more metals selected from the group consisting of Ba, Pb, and Ca. In the above general formula, some of Fe atoms may be replaced with another metal element.

In a case where the magnetic powder contains powder of hexagonal ferrite particles, the average particle size of the magnetic powder is preferably 30 nm or less, more preferably 12 nm or more and 25 nm or less, and still more preferably 15 nm or more and 22 nm or less. When the average particle size of the magnetic powder is 30 nm or less, good electromagnetic conversion characteristics (for example, C/N) can be obtained in a magnetic tape MT having a high recording density. Meanwhile, when the average particle size of the magnetic powder is 12 nm or more, dispersibility of the magnetic powder is further improved, and better electromagnetic conversion characteristics (for example, C/N) can be obtained. In a case where the magnetic powder contains powder of hexagonal ferrite particles, the average aspect ratio of the magnetic powder is similar to those of the above-described embodiments.

Note that the average particle size and the average aspect ratio of the magnetic powder is determined as follows. First, a magnetic tape MT to be measured is processed by an FIB method or the like to manufacture a thin piece, and a cross section of the thin piece is observed with TEM. Next, 50 particles of the magnetic powder oriented at an angle of 75 degrees or more with respect to a horizontal direction are randomly selected from the photographed TEM photograph, and a maximum plate thickness DA of each of the particles of the magnetic powder is measured. Subsequently, the maximum plate thicknesses DA of the measured 50 particles of the magnetic powder are simply averaged (arithmetically averaged) to determine an average maximum plate thickness DAave.

Next, a surface of the recording layer 43 of the magnetic tape MT is observed with TEM. Next, 50 particles of the magnetic powder are randomly selected from the photographed TEM photograph, and a maximum plate diameter DB of each of the particles of the magnetic powder is measured. Here, the maximum plate diameter DB means the largest distance among distances between two parallel lines drawn from all angles so as to come into contact with an outline of each of the particles of the magnetic powder (so-called maximum Feret diameter). Subsequently, the maximum plate diameters DB of the measured 50 particles of the magnetic powder are simply averaged (arithmetically averaged) to determine an average maximum plate diameter DBave. The average maximum plate diameter DBave determined in this manner is taken as the average particle size of the magnetic powder. Next, an average aspect ratio (DBave/DAave) of the magnetic powder is determined from the average maximum plate thickness DAave and the average maximum plate diameter DBave.

In a case where the magnetic powder contains powder of hexagonal ferrite particles, the average particle volume of the magnetic powder is preferably 5900 nm$^3$ or less, more preferably 500 nm$^3$ or more and 3400 nm$^3$ or less, and still more preferably 1000 nm$^3$ or more and 2500 nm$^3$ or less. When the average particle volume of the magnetic powder is 5900 nm$^3$ or less, a similar effect to that in a case where the average particle size of the magnetic powder is 30 nm or less can be obtained. Meanwhile, when the average particle volume of the magnetic powder is 500 nm$^3$ or more, a similar effect to a case where the average particle size of the magnetic powder is 12 nm or more can be obtained.

Note that the average particle volume of the magnetic powder is determined as follows. First, the average maximum plate thickness DAave and the average maximum plate diameter DBave are determined in a similar manner to the above-described method for calculating the average particle size of the magnetic powder. Next, an average particle volume V of the magnetic powder is determined by the following formula.

$$V = 3\sqrt{3}/8 \times \text{DAave} \times \text{DBave}^2$$

(Modification 4)

In the above-described embodiments, the case where magnetic powder contains powder of ε iron oxide particles has been described. However, the magnetic powder may contain powder of nanoparticles containing Co-containing spinel ferrite (hereinafter referred to as "cobalt ferrite particles") instead of the powder of ε iron oxide particles. The cobalt ferrite particle preferably has uniaxial anisotropy. The cobalt ferrite particle has, for example, a cubic shape or a substantially cubic shape. The Co-containing spinel ferrite may further contain at least one of Ni, Mn, Al, Cu, and Zn in addition to Co.

The Co-containing spinel ferrite has, for example, an average composition represented by the following formula (1).

$$Co_xM_yFe_2O_Z \quad (1)$$

(In formula (1), M represents, for example, at least one metal of Ni, Mn, Al, Cu, and Zn). x represents a value within a range of $0.4 \leq x \leq 1.0$. y represents a value within a range of $0 \leq y \leq 0.3$. Provided that x and y satisfy a relationship of $(x+y) \leq 1.0$. z represents a value within a range of $3 \leq z \leq 4$. Some of Fe atoms may be replaced with another metal element.)

In a case where the magnetic powder contains powder of cobalt ferrite particles, the average particle size of the magnetic powder is preferably 25 nm or less, and more preferably 8 nm or more and 23 nm or less. When the average particle size of the magnetic powder is 25 nm or less, good electromagnetic conversion characteristics (for example, C/N) can be obtained in a magnetic tape MT having a high recording density. Meanwhile, when the average particle size of the magnetic powder is 8 nm or more, dispersibility of the magnetic powder is further improved, and better electromagnetic conversion characteristics (for example, C/N) can be obtained. In a case where the magnetic powder contains powder of cobalt ferrite particles, the average aspect ratio of the magnetic powder is similar to those of the above-described embodiments. Furthermore, a method for calculating the average particle size and the average aspect ratio of the magnetic powder is determined in a similar manner to those of the above-described embodiments.

The average particle volume of the magnetic powder is preferably 15000 nm$^3$ or less, and more preferably 500 nm$^3$ or more and 12000 nm$^3$ or less. When the average particle volume of the magnetic powder is 15000 nm$^3$ or less, a similar effect to that in a case where the average particle size of the magnetic powder is 25 nm or less can be obtained. Meanwhile, when the average particle volume of the magnetic powder is 500 nm$^3$ or more, a similar effect to a case where the average particle size of the magnetic powder is 8 nm or more can be obtained. Note that a method for calculating the average particle volume of the magnetic powder is similar to the method for calculating the average particle volume of the magnetic powder (the method for calculating the average particle volume in a case where the ε iron oxide particle has a cubic shape or a substantially cubic shape) in the above-described embodiments.

(Modification 5)

The magnetic tape MT may be used for a library device. In this case, the library device can adjust a tension applied to the magnetic tape MT in a longitudinal direction thereof, and may include a plurality of the recording/reproducing devices 50 in the first embodiment.

(Modification 6)

The magnetic tape MT may be used for a servo writer. In other words, the servo writer adjusts a tension applied to the magnetic tape MT in a longitudinal direction thereof at the time of recording a servo signal or the like, and the width of the magnetic tape MT may be thereby kept constant or substantially constant. In this case, the servo writer may include a detection device that detects the width of the magnetic tape MT, and may adjust a tension applied to the magnetic tape MT in a longitudinal direction thereof on the basis of a detection result of the detection device.

(Modification 7)

The magnetic tape MT is not limited to a perpendicular recording type magnetic recording medium, and may be a horizontal recording type magnetic recording medium. In this case, acicular magnetic powder such as metal magnetic powder may be used as magnetic powder.

(Modification 8)

In the above-described first embodiment, the case where a distance between servo bands SB is used as width-related information related to the magnetic tape MT at the time of data recording has been described, but the width of the magnetic tape MT may be used.

In this case, the control device 59 calculates the width W1 of the magnetic tape MT from the distance d1 between the servo bands SB at the time of data recording, and causes the reader/writer 57 to write the width W1 in the cartridge memory 11.

The control device 59 reads out the width W1 of the magnetic tape MT at the time of data recording from the cartridge memory 11 at the time of data reproduction, and calculates the width W2 of the magnetic tape MT at the time of data reproduction from the distance d2 between the servo bands SB at the time of data reproduction. Then, the control device 59 calculates a difference ΔW between the width W1 of the magnetic tape MT at the time of data recording and the width W2 of the magnetic tape MT at the time of data reproduction, and determines whether or not the difference ΔW is within a prescribed range.

In a case where the difference Δd is within the prescribed range, the control device 59 controls rotational drive of the spindle 51 and the reel 52 so as to maintain a prescribed tension. Meanwhile, in a case where the difference Δd is not within the prescribed range, the control device 59 controls rotational drive of the spindle 51 and the reel 52 such that the difference Δd falls within the prescribed range, and adjusts a tension applied to the traveling magnetic tape MT.

(Modification 9)

In the above-described second embodiment, the case where all of the temperatures Tm1 and Tm2, the humidities H1 and H2, the tensions Tn1 and Tn2, and the widths W1 and W2 are used as the data recording time information has been described. However, as the data recording time information, any one of the temperatures Tm1 and Tm2, the humidities H1 and H2, the tensions Tn1 and Tn2, and the widths W1 and W2 may be used, or a combination of any two or three thereof may be used.

Not only information at the time of data recording (temperature Tm1, humidity H1, tension Tn1, and width W1) but also information at the time of data reproduction (temperature Tm2, humidity H2, tension Tn2, and width W2) may be stored in the cartridge memory 11. For example, the information at the time of data reproduction is used when data in the magnetic tape MT is reproduced at another opportunity after the data is reproduced.

(Modification 10)

In the above-described first and second embodiments, the case in which the magnetic tape MT is an application type magnetic tape in which a base layer, a recording layer, and the like are manufactured by an application step (wet process) has been described. However, the magnetic tape MT may be a thin film type magnetic tape in which a base layer, a recording layer, and the like are manufactured by a technique of manufacturing a vacuum thin film (dry process) such as sputtering. In a case of the thin film type magnetic tape, an average thickness $t_m$ of the recording layer satisfies preferably 9 [nm]≤$t_m$≤90 [nm], more preferably 9 [nm] ≤$t_m$≤20 [nm], still more preferably 9 [nm]≤$t_m$≤15 [nm]. When the average thickness $t_m$ of the recording layer 43 satisfies 9 [nm]≤$t_m$≤90 [nm], electromagnetic conversion characteristics can be improved.

EXAMPLES

Hereinafter, the present disclosure will be described specifically with Examples, but the present disclosure is not limited only to these Examples.

In the following Examples and Comparative Examples, an average thickness $T_{sub}$ of a substrate, an average thickness $t_T$ of a magnetic tape, a dimensional change amount Δw of a magnetic tape in a width direction thereof with respect to a tension change of the magnetic tape in a longitudinal direction thereof, a temperature expansion coefficient α of a magnetic tape, a humidity expansion coefficient β of a magnetic tape, a Poisson's ratio ρ of a magnetic tape, an elastic limit value $σ_{MD}$ of a magnetic tape in a longitudinal direction thereof, a tensile rate V in elastic limit measurement, an average thickness $t_m$ of a recording layer, a squareness ratio S2, an average thickness $t_b$ of a back layer, surface roughness $R_b$ of a back layer, and an interlayer friction coefficient μ between a magnetic surface and a back surface are determined by the measurement method described in the first embodiment. However, as described later, in Example 11, a tensile rate V at the time of measuring an elastic limit value $σ_{MD}$ in a longitudinal direction was different from that in the first embodiment.

Example 1

(Step of Preparing Recording Layer Forming Coating Material)

A recording layer forming coating material was prepared as follows. First, a first composition having the following formulation was kneaded with an extruder. Next, the kneaded first composition and a second composition having the following formulation were added to a stirring tank equipped with a disper, and were premixed. Subsequently, the mixture was further subjected to sand mill mixing, and was subjected to a filter treatment to prepare a recording layer forming coating material.

(First Composition)

Powder of ε iron oxide nanoparticles (ε-$Fe_2O_3$ crystal particles): 100 parts by mass Vinyl chloride-based resin (cyclohexanone solution 30% by mass): 10 parts by mass (Degree of polymerization: 300, Mn=10000, $OSO_3K$=0.07 mmol/g and secondary OH=0.3 mmol/g were contained as polar groups)

Aluminum oxide powder: 5 parts by mass (α-$Al_2O_3$, average particle diameter: 0.2 μm)

Carbon black: 2 parts by mass (Manufactured by Tokai Carbon Co., Ltd., trade name: Seast TA)

(Second Composition)

Vinyl chloride-based resin: 1.1 parts by mass (Resin solution: resin content 30% by mass, cyclohexanone 70% by mass)

n-Butyl stearate: 2 parts by mass

Methyl ethyl ketone: 121.3 parts by mass

Toluene: 121.3 parts by mass

Cyclohexanone: 60.7 parts by mass

Finally, 4 parts by mass of polyisocyanate (trade name: Coronate L, manufactured by Nippon Polyurethane Industry Co., Ltd.) as a curing agent and 2 parts by mass of myristic acid were added to the recording layer forming coating material prepared as described above.

(Step of Preparing Base Layer Forming Coating Material)

A base layer forming coating material was prepared as follows. First, a third composition having the following formulation was kneaded with an extruder. Next, the kneaded third composition and a fourth composition having the following formulation were added to a stirring tank equipped with a disper, and were premixed. Subsequently, the mixture was further subjected to sand mill mixing, and was subjected to a filter treatment to prepare a base layer forming coating material.

(Third Composition)

Acicular iron oxide powder: 100 parts by mass (α-$Fe_2O_3$, average long axis length 0.15 μm)

Vinyl chloride-based resin: 55.6 parts by mass (Resin solution: resin content 30% by mass, cyclohexanone 70% by mass)

Carbon black: 10 parts by mass (Average particle diameter 20 nm)

(Fourth Composition)

Polyurethane-based resin UR8200 (manufactured by Toyobo Co., Ltd.): 18.5 parts by mass n-Butyl stearate: 2 parts by mass Methyl ethyl ketone: 108.2 parts by mass Toluene: 108.2 parts by mass Cyclohexanone: 18.5 parts by mass Finally, 4 parts by mass of polyisocyanate (trade name: Coronate L, manufactured by Nippon Polyurethane Industry Co., Ltd.) as a curing agent and 2 parts by mass of myristic acid were added to the base layer forming coating material prepared as described above.

(Step of Preparing Back Layer Forming Coating Material)

A back layer forming coating material was prepared as follows. The following raw materials were mixed in a stirring tank equipped with a disper, and were subjected to filter treatment to prepare a back layer forming coating material.

Carbon black (manufactured by Asahi Corporation, trade name: #80): 100 parts by mass Polyester polyurethane: 100 parts by mass (Trade name: N-2304, manufactured by Nippon Polyurethane Industry Co., Ltd.)

Methyl ethyl ketone: 500 parts by mass

Toluene: 400 parts by mass

Cyclohexanone: 100 parts by mass (Film Forming Step)

Using the coating material prepared as described above, a base layer having an average thickness $t_u$ of 1.0 μm and a recording layer having an average thickness $t_m$ of 90 nm were formed as follows on a long polyethylene naphthalate film (hereinafter referred to as "PEN film") having an average thickness $T_{sub}$ of 3.8 μm as a substrate (nonmagnetic support). First, a base layer forming coating material was applied onto a film and dried to form a base layer on the film. Next, a recording layer forming coating material was applied onto the base layer and dried to form a recording layer on the base layer. Note that the magnetic powder was subjected to magnetic field orientation in a thickness direction of the film by a solenoid coil when the recording layer forming coating material was dried. Furthermore, time during which a magnetic field was applied to the recording layer forming coating material was adjusted, and a squareness ratio S2 of a magnetic tape in a thickness direction (perpendicular direction) thereof was set to 65%.

Subsequently, a back layer having an average thickness $t_b$ of 0.6 μm was applied to the film on which the base layer and the recording layer had been formed, and was dried. Then, the film on which the base layer, the recording layer, and the back layer had been formed was subjected to a curing treatment. Subsequently, the film was subjected to a calendering treatment to smooth a surface of the recording layer. At this time, a condition (temperature) of the calendering treatment was adjusted such that an interlayer friction coefficient μ between a magnetic surface and the back surface was 0.5. Thereafter, the film was subjected to a recurring treatment to obtain a magnetic tape having an average thickness $t_T$ of 5.5 μm.

(Cutting Step)

The magnetic tape obtained as described above was cut into a width of ½ inches (12.65 mm). As a result, a desired long magnetic tape having characteristics illustrated in Tables 1 and 2 was obtained.

(Servo Pattern Recording Step)

On the magnetic tape obtained as described above, two or more rows of V-shaped magnetic patterns (servo patterns) were recorded in parallel to a longitudinal direction thereof.

(Cartridge Manufacturing Step)

First, a cartridge, one having an area in which tension adjustment information is written in a cartridge memory and capable of writing the tension adjustment information in the area and reading out the tension adjustment information from the area was prepared. Next, a magnetic tape having rows of magnetic patterns recorded thereon was wound around the cartridge. Thereafter, the cartridge was loaded on a recording/reproducing device, prescribed data was recorded therein, and at least two of the above V-shaped magnetic pattern rows were simultaneously reproduced. Alternatively, data was not recorded but at least two of the above V-shaped magnetic pattern rows were only reproduced. From the shape of a reproduction waveform of each of the rows, an interval d1 between the magnetic pattern rows at the time of data recording was measured at regular intervals (at an interval of 1 m), and the positions and the interval were written in the cartridge memory. As a result, a target cartridge was obtained.

Example 2

The thickness of the PEN film was made thinner than that of Example 1 such that the dimensional change amount Δw was 750 [ppm/N]. A cartridge was obtained in a similar manner to Example 1 except for this.

Example 3

The thickness of the PEN film was made thinner than that of Example 1 such that the dimensional change amount Δw was 800 [ppm/N], and the average thicknesses of the back layer and the base layer were thinned. A cartridge was obtained in a similar manner to Example 1 except for this.

Example 4

The thickness of the PEN film was made thinner than that of Example 1 such that the dimensional change amount Δw was 800 [ppm/N], and the average thicknesses of the back layer and the base layer were thinned. Moreover, curing treatment conditions of the film on which the base layer, the recording layer, and the back layer had been formed were adjusted. A cartridge was obtained in a similar manner to Example 1 except for this.

Example 5

A cartridge was obtained in a similar manner to Example 4 except that the composition of the base layer forming coating material was changed such that the temperature expansion coefficient α was 8 [ppm/° C.].

Example 6

A cartridge was obtained in a similar manner to Example 4 except that thin barrier layers were formed on both surfaces of the PEN film such that the humidity expansion coefficient β was 3 [ppm/% RH].

Example 7

A cartridge was obtained in a similar manner to Example 4 except that the composition of the back layer forming coating material was changed such that the Poisson's ratio ρ was 0.31.

Example 8

A cartridge was obtained in a similar manner to Example 4 except that the composition of the back layer forming coating material was changed such that the Poisson's ratio ρ was 0.35.

Example 9

A cartridge was obtained in a similar manner to Example 7 except that the curing condition of the film on which the base layer, the recording layer, and the back layer had been formed were adjusted such that the elastic limit value $\sigma_{MD}$ in a longitudinal direction was 0.80 [N].

Example 10

A cartridge was obtained in a similar manner to Example 7 except that the curing condition of the film on which the base layer, the recording layer, and the back layer had been formed and the recurring condition were adjusted such that the elastic limit value $\sigma_{MD}$ in a longitudinal direction was 3.50 [N].

Example 11

A magnetic tape was obtained in a similar manner to Example 9. Then, the elastic limit value $\sigma_{MD}$ of the obtained magnetic tape was measured by changing the tensile rate V to 5 mm/min when the elastic limit value $\sigma_{MD}$ in a longitudinal direction was measured. As a result, the elastic limit value $\sigma_{MD}$ in the longitudinal direction was 0.80 [N] with no change with respect to the elastic limit value $\sigma_{MD}$ in the longitudinal direction with the tensile rate V of 0.5 mm/min (Example 9).

Example 12

A cartridge was obtained in a similar manner to Example 7 except that the coating thickness of the recording layer forming coating material was changed such that the average thickness $t_m$ of the recording layer was 40 nm.

Example 13

(SUL Film Forming Step)
First, under the following film forming conditions, a CoZrNb layer (SUL) having an average thickness of 10 nm was formed on a surface of a long polymer film as a nonmagnetic support. Note that a PEN film was used as the polymer film.
 Film forming method: DC magnetron sputtering method
 Target: CoZrNb target
 Gas species: Ar
 Gas pressure: 0.1 Pa
(First Seed Layer Forming Step)
Next, a TiCr layer (first seed layer) having an average thickness of 5 nm was formed on the CoZrNb layer under the following film forming conditions.
 Sputtering method: DC magnetron sputtering method
 Target: TiCr target
 Ultimate degree of vacuum: $5 \times 10^{-5}$ Pa
 Gas species: Ar
 Gas pressure: 0.5 Pa
(Second Seed Layer Forming Step)
Next, a NiW layer (second seed layer) having an average thickness of 10 nm was formed on the TiCr layer under the following film forming conditions.
 Sputtering method: DC magnetron sputtering method
 Target: NiW target
 Ultimate degree of vacuum: $5 \times 10^{-5}$ Pa
 Gas species: Ar
 Gas pressure: 0.5 Pa
(First Base Layer Forming Step)
Next, a Ru layer (first base layer) having an average thickness of 10 nm was formed on the NiW layer under the following film forming conditions.
 Sputtering method: DC magnetron sputtering method
 Target: Ru target
 Gas species: Ar
 Gas pressure: 0.5 Pa
(Second Base Layer Forming Step)
Next, on the Ru layer, a Ru layer (second base layer) having an average thickness of 20 nm was formed under the following film forming conditions.
 Sputtering method: DC magnetron sputtering method
 Target: Ru target
 Gas species: Ar
 Gas pressure: 1.5 Pa
(Recording Layer Forming Step)
Next, a (CoCrPt)—(SiO$_2$) layer (recording layer) having an average thickness $t_m$ of 9 nm was formed on the Ru layer under the following film forming conditions.
 Film forming method: DC magnetron sputtering method
 Target: (CoCrPt)—(SiO$_2$) target
 Gas species: Ar
 Gas pressure: 1.5 Pa
(Protective Layer Forming Step)
Next, a carbon layer (protective layer) having an average thickness of 5 nm was formed on the recording layer under the following film forming conditions.
 Film forming method: DC magnetron sputtering method
 Target: carbon target
 Gas species: Ar
 Gas pressure: 1.0 Pa
(Lubricating Layer Forming Step)
Next, a lubricant was applied onto the protective layer to form a lubricating layer.
(Back Layer Forming Step)
Next, a back layer forming coating material was applied to the surface opposite to the recording layer and dried to form a back layer having an average thickness $t_T$ of 0.3 µm. As a result, a magnetic tape having an average thickness $t_T$ of 4.0 µm was obtained.
(Cutting Step)
The magnetic tape obtained as described above was cut into a width of ½ inches (12.65 mm). As a result, a desired long magnetic tape having characteristics illustrated in Tables 1 and 2 was obtained.

A servo pattern was recorded and a cartridge was manufactured in a similar manner to Example 1 except that the magnetic tape obtained as described above was used, and the cartridge was obtained.

Example 14

A cartridge was obtained in a similar manner to Example 7 except that the coating thickness of the back layer forming coating material was changed such that the average thickness $t_b$ of the back layer was 0.3 µm.

Example 15

A cartridge was obtained in a similar manner to Example 7 except that the composition (addition amount of the inorganic filler (carbon black)) of the back layer forming coating material was changed such that the surface roughness $R_b$ of the back layer was 3 [nm].

Example 16

A cartridge was obtained in a similar manner to Example 7 except that the condition (temperature) of the calendering treatment was adjusted such that the interlayer friction coefficient μ between the magnetic surface and the back surface was 0.2.

Example 17

A cartridge was obtained in a similar manner to Example 7 except that the condition (temperature) of the calendering treatment was adjusted such that the interlayer friction coefficient μ between the magnetic surface and the back surface was 0.8.

Example 18

A cartridge was obtained in a similar manner to Example 7 except that the coating thickness of the recording layer forming coating material was changed such that the average thickness $t_m$ of the recording layer was 110 nm.

Example 19

A cartridge was obtained in a similar manner to Example 7 except that the composition (addition amount of the inorganic filler (carbon black)) of the back layer forming coating material was changed such that the surface roughness $R_b$ of the back layer was 7 [nm].

Example 20

A cartridge was obtained in a similar manner to Example 7 except that the condition (temperature) of the calendering treatment was adjusted such that the interlayer friction coefficient μ between the magnetic surface and the back surface was 0.18.

Example 21

A cartridge was obtained in a similar manner to Example 7 except that the condition (temperature) of the calendering treatment was adjusted such that the interlayer friction coefficient μ between the magnetic surface and the back surface was 0.82.

Example 22

A cartridge was obtained in a similar manner to Example 7 except that time during which a magnetic field was applied to the magnetic layer forming coating material was adjusted, and the squareness ratio S2 of the magnetic tape in a thickness direction (perpendicular direction) thereof was set to 73%.

Example 23

A cartridge was obtained in a similar manner to Example 7 except that time during which a magnetic field was applied to the magnetic layer forming coating material was adjusted, and the squareness ratio S2 of the magnetic tape in a thickness direction (perpendicular direction) thereof was set to 80%.

Example 24

A cartridge was obtained in a similar manner to Example 10 except that the curing condition of the film on which the base layer, the recording layer, and the back layer had been formed and the recurring condition were adjusted such that the elastic limit value $\sigma_{MD}$ in the longitudinal direction was 5.00 [N].

Example 25

A cartridge was obtained in a similar manner to Example 7 except that barium ferrite ($BaFe_{12}O_{19}$) nanoparticles were used instead of the ε iron oxide nanoparticles.

Example 26

A PEN film having higher stretching strength in the width direction than the PEN film of Example 7 was used such that the dimensional change amount Δw was 670 [ppm/N]. A cartridge was obtained in a similar manner to Example 25 except for this.

Example 27

A PEN film having higher stretching strength in the width direction than the PEN film of Example 1 was used such that the dimensional change amount Δw was 650 [ppm/N]. A cartridge was obtained in a similar manner to Example 1 except for this.

Comparative Example 1

A PEN film having higher stretching strength in the width direction than the PEN film of Example 26 and having an average thickness $T_{sub}$ of 4.0 μm was used such that the dimensional change amount Δw was 630 [ppm/N]. A cartridge was obtained in a similar manner to Example 1 except for this.

Comparative Example 2

A PEN film having higher stretching strength in the width direction than the PEN film of Example 26 and having an average thickness $T_{sub}$ of 5.0 μm was used such that the dimensional change amount Δw was 500 [ppm/N]. Furthermore, the average thickness $t_b$ of the back layer was 0.4 μm. A cartridge was obtained in a similar manner to Example 1 except for this.

Reference Examples 1 to 26 and Comparative Examples 3 to 5

First, a magnetic tape was obtained in a similar to Examples 1 to 27 and Comparative Examples 1 and 2, and then rows of V-shaped magnetic patterns were recorded on the magnetic tape. Subsequently, as a cartridge, one in which writing of tension adjustment information and reading out of the tension adjustment information might be impossible was prepared. Next, a magnetic tape having rows of magnetic patterns recorded thereon was wound around the cartridge. Thereafter, the cartridge was loaded on a recording/reproducing device, and prescribed data was recorded therein. As a result, a target cartridge was obtained.

(Judgment of Amount of Change in Tape Width (1))

First, each of the cartridges of Examples 1 to 27 and Comparative Examples 1 and 2 was loaded on a recording/reproducing device, and a magnetic tape was reproduced and reciprocated while a tension applied to the magnetic tape in a longitudinal direction thereof was adjusted. At this time, the recording/reproducing device adjusted the tension as follows. In other words, two or more V-shaped magnetic pattern rows were reproduced together with data. From the shape of a reproduction waveform of each of the rows, an interval d2 between the magnetic pattern rows at the time of data reproduction was measured continuously (at every point having servo position information (specifically, approximately every 6 mm), and an interval d1 between the magnetic pattern rows at the time of data recording was read out from the cartridge memory. Then, rotational drive of a spindle drive device and a reel drive device was controlled such that the interval d2 between the magnetic pattern rows at the time of data reproduction approached the interval d1 between the magnetic pattern rows at the time of data recording. A tension applied to the magnetic tape in a longitudinal direction thereof was adjusted automatically. A measurement value for each of the reciprocations of all the intervals between the magnetic pattern rows was taken as an "interval d2 between the measured magnetic pattern rows", and a maximum value of a difference between the interval d2 and a "known interval d1 between magnetic pattern rows in traveling previously" was taken as a "change in tape width". Furthermore, the recording/reproducing device caused a magnetic tape to be reciprocated in a thermo-hygrostat bath. A reciprocation rate was 5 m/sec. The temperature and humidity during the reciprocation were gradually and repeatedly changed independently of the above reciprocation within a temperature range of 10° C. to 45° C. and a relative humidity range of 10% to 80% according to a previously created environmental change program (10° C.10%→29° C.80%→10° C.10% was repeated twice, in which change from 10° C.10% to 29° C.80% was made in two hours, and change from 29° C.80% to 10° C.10% was made in two hours). This evaluation was repeated until the "previously created environmental change program" was completed. After the evaluation was completed, an average value (simple average) was calculated using all the absolute values of the respective "changes in tape width" obtained at the respective reciprocations, and was taken as an "effective amount of change in tape width" of the tape. Judgment was made on each cartridge according to a deviation from an ideal of the "effective amount of change in tape width" (a smaller deviation is more desirable), and a judgment value with any one of eight ratings was given to each cartridge. Note that an evaluation "8" indicated the most desirable judgment result, and an evaluation "1" indicated the most undesirable judgment result. In a magnetic tape with any one of the eight ratings, the following state is observed during traveling of the tape.

8: No abnormality occurs

7: A slight increase in error rate is observed during traveling

6: A serious increase in error rate is observed during traveling

5: It may be impossible to read a servo signal during traveling, and a servo signal is read again to a slight degree (one or two times)

4: It may be impossible to read a servo signal during traveling, and a servo signal is read again to a medium degree (up to 10 times)

3: It may be impossible to read a servo signal during traveling, and a servo signal is read again to a serious degree (more than 10 times)

2: It may be impossible to read a servo signal, and a tape stops occasionally due to a system error 1: It may be impossible to read a servo signal, and a tape stops immediately due to a system error (Judgment of Amount of Change in Tape Width (2))

Each of the cartridges of Reference Examples 1 to 26 and Comparative Examples 1 to 3 was loaded on a recording/reproducing device, and a magnetic tape was reproduced and reciprocated while a tension applied to the magnetic tape in a longitudinal direction thereof was adjusted. At this time, the recording/reproducing device adjusted the tension as follows. In other words, two or more V-shaped magnetic pattern rows were reproduced together with data. From the shape of a reproduction waveform of each of the rows, an interval d2 between the magnetic pattern rows at the time of data reproduction was measured continuously. Then, rotational drive of a spindle drive device and a reel drive device was controlled such that the interval d2 between the magnetic pattern rows at the time of data reproduction approached a prescribed interval d3. A tension applied to the magnetic tape in a longitudinal direction thereof was adjusted automatically. Judgment was made on each cartridge according to a deviation from an ideal of the "effective amount of change in tape width" in a similar manner to judgment of amount of change in tape width (1) except for this, and a judgment value with any one of eight ratings was given to each cartridge. Note that the prescribed interval d3 is an interval of a known magnetic pattern row serving as a reference when a tension applied to the magnetic tape in a longitudinal direction thereof is adjusted, and is stored in advance in the control device of the recording/reproducing device.

(Evaluation of Electromagnetic Conversion Characteristics)

First, a reproduction signal of a magnetic tape used in each of the cartridges of Examples 1 to 27 and Comparative Examples 1 and 2 was acquired using a loop tester (manufactured by MicroPhysics, Inc.). Acquisition conditions of the reproduction signal will be described below.

head: GMR head speed: 2 m/s signal: single recording frequency (10 MHz)

Recording current: optimum recording current

Next, the reproduction signal was captured with a span of 0 to 20 MHz (resolution band width=100 kHz, VBW=30 kHz) with a spectrum analyzer. Next, a peak of the captured spectrum was taken as a signal amount S. Floor noise excluding the peak was integrated to obtain a noise amount N. A ratio S/N between the signal amount S and the noise amount N was determined as a signal-to-noise ratio (SNR). Next, the determined SNR was converted into a relative value (dB) based on the SNR of Comparative Example 1 as a reference medium. Next, it was judged whether electromagnetic conversion characteristics were good or poor as follows using the SNR (dB) obtained as described above.

Good: The SNR of a magnetic tape is equal to or larger than the SNR (=0 (dB)) of the evaluation reference sample (Comparative Example 1).

Poor: The SNR of a magnetic tape is less than the SNR (=0 (dB)) of the evaluation reference sample (Comparative Example 1).

(Evaluation of Winding Deviation)

First, a cartridge sample after the above "judgment of amount of change in tape width (1)" was prepared. Next, the reel around which the tape was wound was taken out from the cartridge sample, and an end face of the wound tape was visually observed. Note that the reel had a flange, at least one flange was transparent or translucent, and the tape winding state inside could be observed through the flange.

As a result of the observation, in a case where the end face of the tape was not flat, and there were steps or protrusions of the tape, it was assumed that there was a winding deviation in the tape. Furthermore, it was assumed that the "winding deviation" was poorer as more "steps and protrusions of the tape were observed. The above judgment was made for each sample. The winding deviation state of each sample was compared to the winding deviation state of Comparative Example 1 as a reference medium, and it was judged whether the state was good or poor as follows.

Good: a case where the winding deviation state of a sample is equal to or less than that of the reference sample (Comparative Example 1)

Poor: a case where the winding deviation state of a sample is more than that of the reference sample (Comparative example 1)

Tables 1 and 2 illustrate configurations and evaluation results of the cartridges of Examples 1 to 27 and Comparative Examples 1 and 2.

TABLE 1

|  | Magnetic material | $T_{sub}$ [μm] | $t_T$ [μm] | Δw [ppm/N] | α [ppm/°C.] | β [ppm/% RH] | ρ | $σ_{MD}$ [N] | V [mm/min] |
|---|---|---|---|---|---|---|---|---|---|
| Example 1 | ε iron oxide | 3.8 | 5.5 | 705 | 5.9 | 5.2 | 0.29 | 0.75 | 0.5 |
| Example 2 | ε iron oxide | 3.3 | 5.0 | 750 | 5.9 | 5.2 | 0.29 | 0.75 | 0.5 |
| Example 3 | ε iron oxide | 3.2 | 4.5 | 800 | 5.9 | 5.2 | 0.29 | 0.75 | 0.5 |
| Example 4 | ε iron oxide | 3.2 | 4.5 | 800 | 6.0 | 5.0 | 0.29 | 0.75 | 0.5 |
| Example 5 | ε iron oxide | 3.2 | 4.5 | 800 | 8.0 | 5.0 | 0.29 | 0.75 | 0.5 |
| Example 6 | ε iron oxide | 3.2 | 4.6 | 800 | 6.0 | 3.0 | 0.29 | 0.75 | 0.5 |
| Example 7 | ε iron oxide | 3.2 | 4.5 | 800 | 6.0 | 5.0 | 0.31 | 0.75 | 0.5 |
| Example 8 | ε iron oxide | 3.2 | 4.5 | 800 | 6.0 | 5.0 | 0.35 | 0.75 | 0.5 |
| Example 9 | ε iron oxide | 3.2 | 4.5 | 800 | 6.0 | 5.0 | 0.31 | 0.80 | 0.5 |
| Example 10 | ε iron oxide | 3.2 | 4.5 | 800 | 6.0 | 5.0 | 0.31 | 3.50 | 0.5 |
| Example 11 | ε iron oxide | 3.2 | 4.5 | 800 | 6.0 | 5.0 | 0.31 | 0.80 | 5.0 |
| Example 12 | ε iron oxide | 3.2 | 4.4 | 800 | 6.0 | 5.0 | 0.31 | 0.75 | 0.5 |
| Example 13 | (CoCrPt)—($SiO_2$) | 3.6 | 4.0 | 800 | 6.0 | 5.0 | 0.31 | 0.75 | 0.5 |
| Example 14 | ε iron oxide | 3.2 | 4.4 | 800 | 6.0 | 5.0 | 0.31 | 0.75 | 0.5 |
| Example 15 | ε iron oxide | 3.2 | 4.5 | 800 | 6.0 | 5.0 | 0.31 | 0.75 | 0.5 |
| Example 16 | ε iron oxide | 3.2 | 4.5 | 800 | 6.0 | 5.0 | 0.31 | 0.75 | 0.5 |
| Example 17 | ε iron oxide | 3.2 | 4.5 | 800 | 6.0 | 5.0 | 0.31 | 0.75 | 0.5 |
| Example 18 | ε iron oxide | 3.2 | 4.5 | 800 | 6.0 | 5.0 | 0.31 | 0.75 | 0.5 |
| Example 19 | ε iron oxide | 3.2 | 4.5 | 800 | 6.0 | 5.0 | 0.31 | 0.75 | 0.5 |
| Example 20 | ε iron oxide | 3.2 | 4.5 | 800 | 6.0 | 5.0 | 0.31 | 0.75 | 0.5 |
| Example 21 | ε iron oxide | 3.2 | 4.5 | 800 | 6.0 | 5.0 | 0.31 | 0.75 | 0.5 |
| Example 22 | ε iron oxide | 3.2 | 4.5 | 800 | 6.0 | 5.0 | 0.31 | 0.75 | 0.5 |
| Example 23 | ε iron oxide | 3.2 | 4.5 | 800 | 6.0 | 5.0 | 0.31 | 0.75 | 0.5 |
| Example 24 | ε iron oxide | 3.2 | 4.5 | 800 | 6.0 | 5.0 | 0.31 | 5.00 | 0.5 |
| Example 25 | $BaFe_{12}O_{19}$ | 3.2 | 4.5 | 800 | 6.0 | 5.0 | 0.31 | 0.75 | 0.5 |
| Example 26 | $BaFe_{12}O_{19}$ | 3.2 | 4.5 | 670 | 6.0 | 5.0 | 0.31 | 0.75 | 0.5 |
| Example 27 | ε iron oxide | 3.8 | 5.5 | 650 | 5.9 | 5.2 | 0.29 | 0.75 | 0.5 |
| Comparative Example 1 | $BaFe_{12}O_{19}$ | 4.0 | 5.7 | 630 | 6.0 | 5.0 | 0.3 | 0.75 | 0.5 |
| Comparative Example 2 | $BaFe_{12}O_{19}$ | 5.0 | 6.5 | 500 | 6.5 | 5.0 | 0.3 | 0.75 | 0.5 |

TABLE 2

|  | $t_m$ [nm] | S2 [%] | $t_u$ [μm] | $t_b$ [μm] | $R_b$ [nm] | μ | Presence or absence of storage area of tension adjustment information | Electromagnetic conversion characteristics | Judgment of amount of change in tape width (1) | Winding deviation |
|---|---|---|---|---|---|---|---|---|---|---|
| Example 1 | 90 | 65 | 1.0 | 0.6 | 6 | 0.5 | Present | Good | 8 | Good |
| Example 2 | 90 | 65 | 1.0 | 0.6 | 6 | 0.5 | Present | Good | 8 | Good |
| Example 3 | 90 | 65 | 0.9 | 0.3 | 6 | 0.5 | Present | Good | 8 | Good |
| Example 4 | 90 | 65 | 0.9 | 0.3 | 6 | 0.5 | Present | Good | 8 | Good |
| Example 5 | 90 | 65 | 0.9 | 0.3 | 6 | 0.5 | Present | Good | 8 | Good |
| Example 6 | 90 | 65 | 1.0 | 0.3 | 6 | 0.5 | Present | Good | 8 | Good |
| Example 7 | 90 | 65 | 0.9 | 0.3 | 6 | 0.5 | Present | Good | 8 | Good |
| Example 8 | 90 | 65 | 0.9 | 0.3 | 6 | 0.5 | Present | Good | 8 | Good |
| Example 9 | 90 | 65 | 0.9 | 0.3 | 6 | 0.5 | Present | Good | 8 | Good |
| Example 10 | 90 | 65 | 0.9 | 0.3 | 6 | 0.5 | Present | Good | 8 | Good |
| Example 11 | 90 | 65 | 0.9 | 0.3 | 6 | 0.5 | Present | Good | 8 | Good |
| Example 12 | 40 | 65 | 0.9 | 0.3 | 6 | 0.5 | Present | Good | 8 | Good |
| Example 13 | 9 | 98 | — | 0.3 | 6 | 0.5 | Present | Good | 8 | Good |
| Example 14 | 90 | 65 | 0.8 | 0.3 | 6 | 0.5 | Present | Good | 8 | Good |
| Example 15 | 90 | 65 | 0.9 | 0.3 | 3 | 0.5 | Present | Good | 8 | Good |
| Example 16 | 90 | 65 | 0.9 | 0.3 | 6 | 0.2 | Present | Good | 8 | Good |
| Example 17 | 90 | 65 | 0.9 | 0.3 | 3 | 0.8 | Present | Good | 8 | Good |
| Example 18 | 110 | 65 | 0.9 | 0.3 | 6 | 0.5 | Present | Poor | 8 | Good |
| Example 19 | 90 | 65 | 0.9 | 0.3 | 7 | 0.5 | Present | Poor | 8 | Good |
| Example 20 | 90 | 65 | 0.9 | 0.3 | 6 | 0.18 | Present | Good | 8 | Poor |
| Example 21 | 90 | 65 | 0.9 | 0.32 | 6 | 0.8 | Present | Good | 8 | Poor |
| Example 22 | 90 | 73 | 0.9 | 0.3 | 6 | 0.5 | Present | Good | 8 | Good |
| Example 23 | 90 | 80 | 0.9 | 0.3 | 6 | 0.5 | Present | Better | 8 | Good |
| Example 24 | 90 | 65 | 0.9 | 0.3 | 6 | 0.5 | Present | Good | 8 | Good |
| Example 25 | 90 | 65 | 0.9 | 0.3 | 6 | 0.5 | Present | Good | 8 | Good |
| Example 26 | 90 | 65 | 0.9 | 0.3 | 6 | 0.5 | Present | Good | 8 | Good |
| Example 27 | 90 | 65 | 1.0 | 0.6 | 6 | 0.5 | Present | Good | 8 | Good |
| Comparative Example 1 | 90 | 65 | 1.0 | 0.6 | 6 | 0.5 | Present | Good | 3 | Good |
| Comparative Example 2 | 90 | 65 | 1.0 | 0.4 | 6 | 0.5 | Present | Good | 1 | Good |

Table 3 illustrates evaluation results of the cartridges of Reference Examples 1 to 26 and Comparative Examples 3 to 5.

TABLE 3

| | Presence or absence of storage area of tension adjustment information | Judgment of amount of change in tape width (2) |
|---|---|---|
| Reference Example 1 | Absent | 4 |
| Reference Example 2 | Absent | 5 |
| Reference Example 3 | Absent | 6 |
| Reference Example 4 | Absent | 7 |
| Reference Example 5 | Absent | 7 |
| Reference Example 6 | Absent | 8 |
| Reference Example 7 | Absent | 7 |
| Reference Example 8 | Absent | 7 |
| Reference Example 9 | Absent | 8 |
| Reference Example 10 | Absent | 8 |
| Reference Example 11 | Absent | 8 |
| Reference Example 12 | Absent | 7 |
| Reference Example 13 | Absent | 7 |
| Reference Example 14 | Absent | 7 |
| Reference Example 15 | Absent | 7 |
| Reference Example 16 | Absent | 7 |
| Reference Example 17 | Absent | 7 |
| Reference Example 18 | Absent | 7 |
| Reference Example 19 | Absent | 7 |
| Reference Example 20 | Absent | 7 |
| Reference Example 21 | Absent | 7 |
| Reference Example 22 | Absent | 8 |
| Reference Example 23 | Absent | 8 |
| Reference Example 24 | Absent | 8 |
| Reference Example 25 | Absent | 7 |
| Reference Example 26 | Absent | 4 |
| Comparative Example 3 | Absent | 1 |
| Comparative Example 4 | Absent | 1 |
| Comparative Example 5 | Absent | 1 |

Note that the symbols in Tables 1 and 2 mean the following measured values.

$T_{sub}$: average thickness of substrate $t_T$: thickness of magnetic tape $\Delta w$: dimensional change amount of magnetic tape in width direction thereof with respect to tension change of the magnetic tape in longitudinal direction thereof $\alpha$: temperature expansion coefficient of magnetic tape $\beta$: humidity expansion coefficient of magnetic tape $\rho$: Poisson's ratio of magnetic tape $\sigma_{MD}$: elastic limit value of magnetic tape in longitudinal direction thereof V: tensile rate in elastic limit measurement $t_m$: average thickness of recording layer R2: squareness ratio of magnetic tape in thickness direction (perpendicular direction) thereof $t_u$: average thickness of base layer $t_b$: average thickness of back layer $R_b$: surface roughness of back layer $\mu$: interlayer friction coefficient between magnetic surface and back surface Tables 1 to 4 indicate the following.

From comparison of the evaluation results of Examples 1 to 3, 26, and 27 and Comparative Examples 1, 2, and the like, it is found that a deviation from an ideal of the "effective amount of change in tape width" can be suppressed by setting the dimensional change amount $\Delta w$ of a magnetic tape to 650 [ppm/N]≤$\Delta w$ and adjusting a tension applied to the magnetic tape in a longitudinal direction thereof using tension adjustment information stored in a cartridge memory at the time of data recording.

From comparison of the evaluation results of Examples 1 to 3, 26, and 27, Comparative Examples 1 and 2, Reference Examples 1 to 3 and 26, and Comparative Examples 3 to 5 and the like, the following is found. In other words, by adjusting a tension applied to a magnetic tape in a longitudinal direction thereof using tension adjustment information stored in a cartridge memory at the time of data recording, a lower limit value of the dimensional change amount $\Delta w$ required for suppressing a deviation from an ideal of the "effective amount of change in tape width" can be reduced from 670 [ppm/N] to 650 [ppm/N]≤$\Delta w$.

From comparison of the evaluation results of Examples 1 to 3, 26, and 27 and Comparative Examples 1, 2, and the like, it is found that the dimensional change amount $\Delta w$ satisfies preferably 670 [ppm/N]≤$\Delta w$, more preferably 680 [ppm/N]≤$\Delta w$, still more preferably 700 [ppm/N]≤$\Delta w$, particularly preferably 750 [ppm/N]≤$\Delta w$, most preferably 800 [ppm/N]≤$\Delta w$ from a viewpoint of suppressing a deviation from an ideal of the "effective amount of change in tape width".

From comparison of the evaluation results of Reference Examples 3 to 5 and the like, it is found that the temperature expansion coefficient $\alpha$ preferably satisfies 6 [ppm/° C.]≤$\alpha$≤8 [ppm/° C.] from a viewpoint of suppressing a deviation from an ideal of the "effective amount of change in tape width".

From comparison of the evaluation results of Reference Examples 3, 4, 6, and the like, it is found that the humidity expansion coefficient $\beta$ preferably satisfies $\beta$≤5 [ppm/% RH] from a viewpoint of suppressing a deviation from an ideal of the "effective amount of change in tape width".

From comparison of the evaluation results of Reference Examples 6 to 8 and the like, it is found that the Poisson's ratio preferably satisfies 0.3≤$\rho$ from a viewpoint of suppressing a deviation from an ideal of the "effective amount of change in tape width".

From comparison of the evaluation results of Reference Examples 7, 9, 10, 24, and the like, it is found that the elastic limit value $\sigma_{MD}$ preferably satisfies 0.8 [N]≤$\sigma_{MD}$ from a viewpoint of suppressing a deviation from an ideal of the "effective amount of change in tape width".

It is found that the elastic limit values $\sigma_{MD}$ of Examples 9, 11, and the like do not depend on the tensile rate V in elastic limit measurement.

Note that in each of Examples 1 to 27, regardless of the values of the temperature expansion coefficient $\alpha$, the humidity expansion coefficient $\beta$, the Poisson's ratio $\rho$, and the elastic limit value $\sigma_{MD}$ in a longitudinal direction, the result of "judgment of amount of change in tape width (1)" was "8". This is because the judgment of the amount of change in tape width was evaluated with eight ratings. In a case where more detailed evaluation (for example, evaluation with 10 ratings) is made, it is presumed that also in Examples 1 to 27, an evaluation result capable of further suppressing a deviation from an ideal of the "effective amount of change in tape width" will be obtained within numerical ranges of the temperature expansion coefficient $\alpha$, the humidity expansion coefficient $\beta$, the Poisson's ratio $\rho$, and the elastic limit value $\sigma_{MD}$ in a longitudinal direction, similar to those in Reference Examples 1 to 26.

From comparison of the evaluation results of Examples 9, 12, 18, and the like, it is found that the average thickness $t_m$ of the recording layer preferably satisfies $t_m$≤90 [nm] from a viewpoint of improving electromagnetic conversion characteristics.

From comparison of the evaluation results of Examples 7, 15, 19, and the like, it is found that the surface roughness $R_b$ of the back layer preferably satisfies $R_b \leq 6.0$ [nm] from a viewpoint of improving electromagnetic conversion characteristics.

From comparison of the evaluation results of Examples 7, 16, 17, 21, and the like, it is found that the interlayer friction coefficient μ between the magnetic surface and the back surface preferably satisfies $0.20 \leq \mu \leq 0.80$ from a viewpoint of suppressing a winding deviation.

From comparison of the evaluation results of Examples 7, 22, 23, and the like, it is found that the squareness ratio S2 of the magnetic tape in a perpendicular direction thereof is preferably 80% or more from a viewpoint of improving electromagnetic conversion characteristics.

From comparison of the evaluation results of Example 7, 25, 26, and the like, it is found that evaluation results similar to those in the case of using ε iron oxide nanoparticles as the magnetic particles can be obtained by adjusting parameters such as the dimensional change amount Δw, the temperature expansion coefficient α, and the humidity expansion coefficient β even in a case of using barium ferrite nanoparticles as the magnetic particles.

Hereinabove, the embodiments of the present disclosure and Modifications thereof have been described specifically. However, the present disclosure is not limited to the above-described embodiments and Examples, but various modifications based on the technical idea of the present disclosure can be made.

For example, the configurations, the methods, the steps, the shapes, the materials, the numerical values, and the like exemplified in the above-described embodiments and Modifications are only examples, and a configuration, a method, a step, a shape, a material, a numerical value, and the like different therefrom may be used as necessary. Furthermore, the chemical formulas of the compounds and the like are representative and are not limited to the described valences and the like as long as the compounds have common names of the same compound.

Furthermore, the configurations, the methods, the steps, the shapes, the materials, the numerical values, and the like in the above-described embodiments and Modifications can be combined to each other as long as not departing from the gist of the present disclosure.

Furthermore, within the numerical range described step by step here, an upper limit value or a lower limit value of a numerical range in one stage may be replaced with an upper limit value or a lower limit value of a numerical range in another stage. The materials exemplified here can be used singly or in combination of two or more thereof unless otherwise specified.

Furthermore, the present disclosure can adopt the following configurations.

(1)

A cartridge including:

a tape-shaped magnetic recording medium;

a communication unit that communicates with a recording/reproducing device;

a storage unit; and a control unit that stores information received from the recording/reproducing device through the communication unit in the storage unit, reads the information from the storage unit according to a request from the recording/reproducing device, and transmits the information to the recording/reproducing device through the communication unit, in which the information includes adjustment information for adjusting a tension applied to the magnetic recording medium in a longitudinal direction thereof, the magnetic recording medium has an average thickness $t_T$ satisfying $t_T \leq 5.5$ [μm], and the magnetic recording medium has a dimensional change amount Δw satisfying 650 [ppm/N]≤Δw in a width direction thereof with respect to a tension change of the magnetic recording medium in the longitudinal direction thereof.

(2)

The cartridge according to (1), in which the dimensional change amount Δw satisfies 700 [ppm/N]≤Δw.

(3)

The cartridge according to (1), in which the dimensional change amount Δw satisfies 750 [ppm/N]≤Δw.

(4)

The cartridge according to (1), in which the dimensional change amount Δw satisfies 800 [ppm/N]≤Δw.

(5)

The cartridge according to any one of (1) to (4), in which the adjustment information is acquired at the time of data recording on the magnetic recording medium.

(6)

The cartridge according to (5), in which the adjustment information includes width-related information related to the width of the magnetic recording medium.

(7)

The cartridge according to (6), in which the width-related information is distance information between adjacent servo tracks or width information of the magnetic recording medium.

(8)

The cartridge according to any one of (5) to (7), in which the adjustment information includes environmental information around the magnetic recording medium.

(9)

The cartridge according to (8), in which the environmental information includes temperature information around the magnetic recording medium.

(10)

The cartridge according to (8) or (9), in which the environmental information includes humidity information around the magnetic recording medium.

(11)

The cartridge according to any one of (5) to (10), in which the adjustment information includes tension information of the magnetic recording medium.

(12)

The cartridge according to any one of (1) to (11), in which the storage unit has:

a first storage area for storing first information conforming to a magnetic tape standard; and a second storage area for storing second information other than the first information, and the second information includes the adjustment information.

(13)

The cartridge according to any one of (1) to (12), in which the magnetic recording medium has a temperature expansion coefficient α satisfying 6 [ppm/° C.]≤α≤8 [ppm/° C.].

(14)

The cartridge according to any one of (1) to (13), in which the magnetic recording medium has a humidity expansion coefficient β satisfying β≤5 [ppm/% RH].

(15)

The cartridge according to any one of (1) to (14), in which the magnetic recording medium has a Poisson's ratio ρ satisfying 0.3≤ρ.

(16)

The cartridge according to any one of (1) to (15), in which the magnetic recording medium has an elastic limit value $\sigma_{MD}$ satisfying $0.8\ [N] \leq \sigma_{MD}$ in a longitudinal direction thereof.

(17)

The cartridge according to any one of (1) to (16), in which the magnetic recording medium can form 6000 or more data tracks.

(18)

The cartridge according to any one of (1) to (17), conforming to LTO 9 or later standards.

(19)

The cartridge according to any one of (1) to (18), in which the magnetic recording medium includes a recording layer, and the recording layer has an average thickness $t_m$ satisfying $9\ [nm] \leq t_m \leq 90\ [nm]$.

(20)

The cartridge according to (19), in which the average thickness $t_m$ of the recording layer satisfies $35\ [nm] \leq t_m \leq 90\ [nm]$.

(21)

The cartridge according to any one of (1) to (20), including a back layer, in which the back layer has an average thickness $t_b$ satisfying $t_b \leq 0.6\ [\mu m]$.

(22)

The cartridge according to any one of (1) to (21), including a back layer, in which the back layer has a surface roughness $R_b$ satisfying $R_b \leq 6.0\ [nm]$.

(23)

The cartridge according to any one of (1) to (22), including a magnetic surface and a back surface opposite to the magnetic surface, in which an interlayer friction coefficient $\mu$ between the magnetic surface and the back surface satisfies $0.20 \leq \mu \leq 0.80$.

(24)

The cartridge according to any one of (1) to (23), in which the magnetic recording medium includes a recording layer containing magnetic powder, and the magnetic powder contains ε iron oxide, hexagonal ferrite, or Co-containing spinel ferrite.

(25)

The cartridge according to any one of (1) to (24), in which the magnetic recording medium has a squareness ratio of 65% or more in a perpendicular direction thereof.

(26)

The cartridge according to any one of (1) to (25), in which the magnetic recording medium has a squareness ratio of 70% or more in a perpendicular direction thereof.

(27)

The cartridge according to any one of (1) to (26), in which a coercive force Hc1 of the magnetic recording medium in a perpendicular direction thereof and a coercive force Hc2 of the magnetic recording medium in a longitudinal direction thereof satisfy a relationship of $Hc2/Hc1 \leq 0.8$.

(28)

The cartridge according to any one of (1) to (27), in which the magnetic recording medium includes a magnetic layer containing a lubricant, the magnetic layer has a surface having a large number of holes formed thereon, and the entire magnetic recording medium has a BET specific surface area of 3.5 m²/mg or more in a state where the lubricant has been removed.

(29)

A cartridge including:

a tape-shaped magnetic recording medium; and a storage unit having an area in which adjustment information for adjusting a tension applied to the magnetic recording medium in a longitudinal direction thereof is written, in which the magnetic recording medium has an average thickness $t_T$ satisfying $t_T \leq 5.5\ [\mu m]$, and the magnetic recording medium has a dimensional change amount $\Delta w$ satisfying $650\ [ppm/N] \leq \Delta w$ in a width direction thereof with respect to a tension change of the magnetic recording medium in the longitudinal direction thereof.

(30)

A cartridge memory used for a tape-shaped magnetic recording medium, including:

a communication unit that communicates with a recording/reproducing device;

a storage unit; and a control unit that stores information received from the recording/reproducing device through the communication unit in the storage unit, reads the information from the storage unit according to a request from the recording/reproducing device, and transmits the information to the recording/reproducing device through the communication unit, in which the information includes adjustment information for adjusting a tension applied to the magnetic recording medium in a longitudinal direction thereof.

(31)

A cartridge memory used for a tape-shaped magnetic recording medium, including a storage unit having an area in which adjustment information for adjusting a tension applied to the magnetic recording medium in a longitudinal direction thereof is written.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10 Cartridge
11 Cartridge memory
31 Antenna coil
32 Rectification/power supply circuit
33 Clock circuit
34 Detection/modulation circuit
35 Controller
36 Memory
36A First storage area
36B Second storage area
41 Substrate
42 Base layer
43 Recording layer
44 Back layer
50, 50A Recording/reproducing device
51 Spindle
52 Reel
53 Spindle drive device
54 Reel drive device
55 Guide roller
56 Head unit
57 Reader/writer
58 Communication interface 59 Control device
60 Thermometer
61 Hygrometer
100, 100A Recording/reproducing system
MT Magnetic tape

The invention claimed is:

1. A cartridge comprising:
a tape-shaped magnetic recording medium; and
a cartridge memory, wherein
the cartridge memory comprises
a communication unit that communicates with a recording/reproducing device in a state where the cartridge is loaded on the recording/reproducing device;
a storage unit; and
a control unit that stores information received from the recording/reproducing device through the communication unit in the storage unit, reads the information from the storage unit according to a request from the recording/reproducing device, and transmits the information to the recording/reproducing device through the communication unit,
wherein the information includes manufacturing information of the cartridge and adjustment information for adjusting a tension applied to the tape-shaped magnetic recording medium in a longitudinal direction thereof of the tape-shaped magnetic recording medium, and
wherein the tape-shaped magnetic recording medium has a plurality of servo bands, and
wherein an elastic limit value $\sigma_{MD}$ of the tape-shaped-magnetic recording medium in the longitudinal direction of the tape-shaped magnetic recording medium satisfies $0.8\ [N] \leq \sigma_{MD}$.

2. The cartridge according to claim 1, further comprising a rectification/power supply circuit.

3. The cartridge according to claim 1, further comprising a clock circuit.

4. The cartridge according to claim 1, further comprising a detection/modulation circuit.

5. The cartridge according to claim 1, wherein the storage unit includes a non-volatile memory.

6. The cartridge according to claim 1, wherein
the storage unit has:
a first storage area for storing first information conforming to a magnetic tape standard; and
a second storage area for storing second information other than the first information,
wherein the first information includes the manufacturing information of the cartridge and
wherein the second information includes the adjustment information.

7. The cartridge according to claim 6, wherein
the storage unit has a plurality of banks, and
a first group of the plurality of banks constitutes the first storage area and a second group of the plurality of banks constitutes the second storage area.

8. The cartridge according to claim 1, wherein the adjustment information is acquired at the time of data recording on the magnetic recording medium.

9. The cartridge according to claim 1, wherein the adjustment information includes width information of the tape-shaped magnetic recording medium.

10. The cartridge according to claim 1, wherein the adjustment information includes distance information between adjacent servo bands of the plurality of servo bands.

11. The cartridge according to claim 1, wherein the adjustment information includes environmental information around the tape-shaped magnetic recording medium.

12. The cartridge according to claim 11, wherein the environmental information includes temperature information around the tape-shaped magnetic recording medium.

13. The cartridge according to claim 11, wherein the environmental information includes humidity information around the tape-shaped magnetic recording medium.

14. The cartridge according to claim 1, wherein the adjustment information includes tension information of the tape-shaped magnetic recording medium.

15. The cartridge according to claim 1, wherein the information includes usage history information of the cartridge.

16. The cartridge according to claim 1, wherein the information includes at least one of management ledger data, Index information, or thumbnail information of a moving image stored in the tape-shaped magnetic recording medium.

17. The cartridge according to claim 1, wherein the storage unit has a storage capacity of 32 KB or more.

18. The cartridge according to claim 1, wherein the communication unit has an antenna coil.

19. The cartridge according to claim 1, wherein a servo signal is written in the plurality of servo bands.

20. The cartridge according to claim 19, wherein the servo signal is a V-shaped servo pattern.

21. The cartridge according to claim 1, wherein number of the servo bands is 5 or more.

22. The cartridge according to claim 1, wherein number of the servo bands is 9 or more.

23. The cartridge according to claim 1, wherein a servo bandwidth of a servo band of the plurality of servo bands is 10 μm or more, and 95 μm or less.

24. The cartridge according to claim 1, wherein a servo bandwidth of a servo band of the plurality of servo bands is 10 μm or more, and 60 μm or less.

25. The cartridge according to claim 1, wherein the cartridge memory faces a reader/writer of the recording/reproducing device in the state where the cartridge is loaded on the recording/reproducing device.

26. The cartridge according to claim 1, wherein
the cartridge memory faces a reader/writer of the recording/reproducing device in the state where the cartridge is loaded on the recording/reproducing device;
the storage unit has:
a first storage area for storing first information conforming to a magnetic tape standard; and
a second storage area for storing second information other than the first information;
the first information includes the manufacturing information of the cartridge; wherein
the second information includes the adjustment information;
the adjustment information includes at least one of distance information between adjacent servo bands of the plurality of servo bands or width information of the tape-shaped magnetic recording medium;
a V-shaped servo pattern is written in the plurality of servo bands;
the tape-shaped magnetic recording medium has 5 servo bands or more; and
a servo bandwidth of a servo band of the plurality of servo bands is 10 μm or more, and 95 μm or less.

* * * * *